US012619665B2

(12) United States Patent
Escalona et al.

(10) Patent No.:    US 12,619,665 B2
(45) Date of Patent:          May 5, 2026

(54) SYSTEMS AND METHODS FOR ANALYZING MEDIA FEEDS

(71) Applicant: Thomson Reuters Enterprise Centre GmbH, Zug (CH)

(72) Inventors: Rogelio Escalona, Norwalk, CT (US); Xiao Xiao, Toronto (CA); Nathan Harris, St. Ives (GB); Mahesh Ramachandran, East Brunswick, NJ (US); Paul Cifarelli, Bronxville, NY (US); Chad Longo, St. Petersburg, FL (US); Katherine Kent, Milton, VT (US); Yelena Altman Shapiro, Castro Valley, CA (US); Laura McCurdy, Webster, NY (US); Andrew Petrosie, Rochester, NY (US); Matthew Lawrence, Rochester, NY (US); Joseph Santoru, Victor, NY (US); Bob Rhodes, Thomasville, GA (US); John Kennedy, London (GB); Spencer Torene, Potomac, MD (US)

(73) Assignee: Thomson Reuters Enterprise Centre GmbH, Zug (CH)

(*) Notice: Subject to any disclaimer, the term of this patent is extended or adjusted under 35 U.S.C. 154(b) by 0 days.

(21) Appl. No.: 17/534,017

(22) Filed: Nov. 23, 2021

(65) Prior Publication Data

US 2022/0164397 A1      May 26, 2022

Related U.S. Application Data

(60) Provisional application No. 63/117,811, filed on Nov. 24, 2020.

(51) Int. Cl.
*G06F 16/93*          (2019.01)
*G06F 40/20*          (2020.01)
(Continued)

(52) U.S. Cl.
CPC .................................... *G06F 16/93* (2019.01)

(58) Field of Classification Search
USPC ......................................................... 707/771
See application file for complete search history.

(56) References Cited

U.S. PATENT DOCUMENTS

2002/0138417 A1* 9/2002 Lawrence .............. G06Q 40/08
                                                              705/38
2015/0205954 A1* 7/2015 Jou ........................ G06F 21/316
                                                              726/22

(Continued)

FOREIGN PATENT DOCUMENTS

WO      WO-2019194787 A1    10/2019

OTHER PUBLICATIONS

Nicola Paltrinieri; Learning about risk: Machine learning for risk assessment; Elsevier; 2019; pp. 475-486.*

(Continued)

*Primary Examiner* — Ann J Lo
*Assistant Examiner* — Jermaine A Mincey
(74) *Attorney, Agent, or Firm* — Norton Rose Fulbright US LLP

(57) ABSTRACT

Aspects of the present disclosure provide systems, methods, apparatus, and computer-readable storage media that support relevance-based analysis and filtering of documents and media for one or more enterprises. Aspects disclosed herein leverage custom-built taxonomies, natural language processing (NLP), and machine learning (ML) for identifying and extracting features from highly-relevant documents. The extracted features are vectorized and then filtered based on entities (e.g., enterprises, organizations, individuals, etc.) and compliance-based risks (e.g., illegal or non-compliant activities) that are highly relevant to a particular client. The filtered feature vectors are used to identify and highlight (Continued)

relevant information in the corresponding documents, enabling decision making to resolve compliance-related risks. The aspects described herein generate fewer false positive or otherwise less relevant results than conventional document screening applications or manual techniques.

19 Claims, 7 Drawing Sheets

(51) Int. Cl.
*G06N 20/00* (2019.01)
*G06Q 30/018* (2023.01)

(56) References Cited

U.S. PATENT DOCUMENTS

| | | | |
|---|---|---|---|
| 2019/0006027 A1 | 1/2019 | Sacaleanu et al. | |
| 2019/0266257 A1* | 8/2019 | Natchu | G06F 16/137 |
| 2020/0067861 A1 | 2/2020 | Leddy et al. | |
| 2020/0073953 A1 | 3/2020 | Kulkarni | |
| 2020/0234183 A1* | 7/2020 | Ghatage | G06N 3/044 |
| 2021/0081899 A1* | 3/2021 | Venkatasubramanian | G06N 20/20 |
| 2021/0383407 A1* | 12/2021 | Pati | G06Q 40/12 |

OTHER PUBLICATIONS

Patent Cooperation Treaty, International Search Report and Written Opinion issued for PCT Application No. PCT/US2021/060582, dated Feb. 14, 2022, 9 pages.

European Patent Office, Communication, Extended European Search Report issued for European Patent Application No. 21899036.4, dated Nov. 5, 2024, 8 pages.

* cited by examiner

700

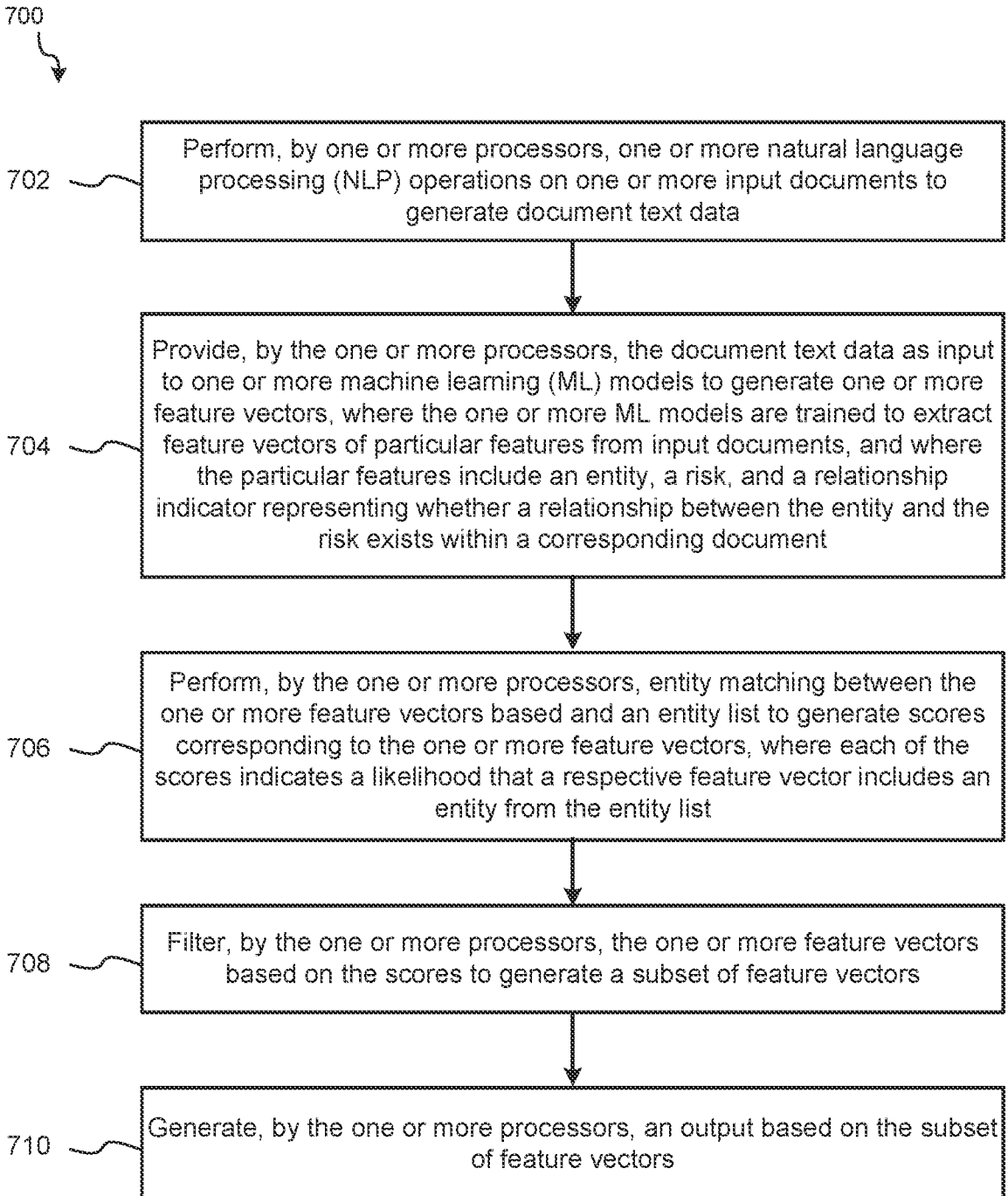

702 — Perform, by one or more processors, one or more natural language processing (NLP) operations on one or more input documents to generate document text data 704 — Provide, by the one or more processors, the document text data as input to one or more machine learning (ML) models to generate one or more feature vectors, where the one or more ML models are trained to extract feature vectors of particular features from input documents, and where the particular features include an entity, a risk, and a relationship indicator representing whether a relationship between the entity and the risk exists within a corresponding document 706 — Perform, by the one or more processors, entity matching between the one or more feature vectors based and an entity list to generate scores corresponding to the one or more feature vectors, where each of the scores indicates a likelihood that a respective feature vector includes an entity from the entity list 708 — Filter, by the one or more processors, the one or more feature vectors based on the scores to generate a subset of feature vectors 710 — Generate, by the one or more processors, an output based on the subset of feature vectors

*FIG. 7*

SYSTEMS AND METHODS FOR ANALYZING MEDIA FEEDS

CROSS-REFERENCE TO RELATED APPLICATIONS

The present application claims the benefit of priority from U.S. Provisional Patent Application No. 63/117,811 filed Nov. 24, 2020 and entitled "SYSTEMS AND METHODS OF ANALYZING MEDIA FEEDS," the disclosure of which is incorporated by reference herein in its entirety.

TECHNICAL FIELD

The present disclosure relates generally to analyzing and filtering a plurality of documents to improve the relevance of filtered documents. More particularly, compliance-based filtering is described to filter documents that are highly relevant toward compliance with government or industry sector rules and regulations.

BACKGROUND

Changes in government regulations and industry rules increase the cost and complexity of compliance for enterprises or organizations. As a particular example, the regulatory compliance environment for financial institutions is increasingly strict, with unprecedented fines and attention paid to both intent and action by executives and compliance officers. To illustrate, it is estimated that $36 billion dollars in compliance fines have been assessed on financial institutions since 2008 in an attempt to curb the estimated $3 trillion in money laundering transactions, only 1% of the illicit financial flows of which are seized. The explosive growth of online news and world-wide news articles has resulted in a data overload for financial institutions attempting to comply with these regulations. For example, there has been an estimated 1000% increase in false negative news reports and false suspicious activity alerts in recent years.

This increase in false positive articles and in complexity of regulations and rules poses challenges for financial institutions from a compliance perspective. To respond to the risks associated with failing to comply with regulations and rules, some financial institutions are investing in implementing costly compliance departments staffed with an increasing number of workers, which are typically unable to keep up with the increased volume of news articles to be reviewed for possible compliance issues. Additionally, results generated by these analysts are frequently subject to analyst bias and inconsistencies, and typically based almost exclusively on web-searched content. Some other financial institutions have resorted to outsourcing compliance review and reporting, which is often incomplete, inaccurate, and costly. Although some automated solutions exist, these automated systems provide un-vetted reporting (e.g., that places the burden on the enterprise receiving the reporting) and high volumes of false positives. Additionally, automated alerting systems are designed to search for generalized risks and not for specific, highly relevant risks to an individual enterprise or industry sector. For these reasons, compliance officers are overloaded, resulting in actual suspicious activity going unobserved and high risk entities, such as financial institutions, not being reviewed with sufficient frequency.

SUMMARY

Aspects of the present disclosure provide systems, methods, apparatus, and computer-readable storage media that support relevance-based analysis and filtering of documents and media for one or more enterprises, particularly in industry sectors associated with high risk of non-compliance with government regulations or industry rules. Aspects disclosed herein leverage custom-built taxonomies, natural language processing (NLP), and machine learning (ML) for identifying and extracting features from highly-relevant documents. The extracted features are then filtered based on entities (e.g., enterprises, organizations, executives, board members, employees, customers, etc.) and risks (e.g., non-compliance activities) that are highly relevant to a particular client. The filtered features are used to identify and highlight relevant information in the corresponding documents, thereby outputting relevant documents and highlighting for compliance offices of an organization to use in making important decisions. Optionally, the filtered articles may be provided to one or more document experts for additional filtering prior to being output. As such, the aspects disclosed herein perform adverse media screening to provide highly relevant documents with fewer false positives than conventional screening systems and techniques, decreasing the risk of non-compliance to an enterprise. Additionally, the systems and techniques described herein include automated (or semi-automated) systems that are lower cost and faster than conventional manual compliance review techniques or imprecise and inaccurate automated review systems or applications.

To illustrate relevance-based analysis and filtering according to one or more aspects of the present disclosure, a server may include or have access to one or more ML models that are trained to extract particular features, such as entities, risks, and relationships between the entities and the risks, from documents. For example, the one or more ML models may be trained based on results of NLP performed on a plurality of labeled documents (e.g., documents in which entities, risks, and relationships are labeled). The plurality of labeled documents may be selected to develop a taxonomy of risks that are highly relevant to a client enterprise, such as a financial institution that is high risk for compliance with government regulations. For example, the risks may include embezzlement, money laundering, funding human trafficking or drug cartels, insider trading, Security and Exchange Commission (SEC) violations, or the like, as compared to more generic risks such as fraud, theft, misappropriation, or the like. After the one or more ML models are trained, the server may receive input documents to be reviewed, and the server may perform NLP on the input documents to generate input data provided to the one or more ML models. The one or more ML models may output feature vectors (e.g., triples) that include entities, risks, and relationships extracted from the input documents. In some implementations, the feature vectors may be further processed to discard some results, such as by performing deduplication or entity resolution to discard duplicate articles or articles that correspond to entities that are not of interest.

The server may then perform entity matching (and/or risk matching) on the feature vectors to filter articles that are not related to entities or risks that are relevant to a particular client. The filtered feature vectors may be scored and further filtered based on the score, and optionally based on user input from one or more document experts, to generate a filtered set of feature vectors. The server may generate an output based on the filtered set of feature vectors, such as by causing display of a graphical user interface (GUI) that displays portions of the corresponding articles, which may be highlighted to identify the entities and the risks, or by outputting an instruction to automatically perform a compliance-based activity based on the filtered set of feature vectors, such as scheduling a meeting for executives and the board, terminating an employee, initiating an audit of one or more accounts, or the like. Although described above in the context of financial institutions and government regulations, aspects disclosed herein may be applied to a variety of industry sectors, such as healthcare providers, law firms, supply chains, non-profit agencies, government agencies, or the like, for use in monitoring compliance with government regulations or industry sector rules.

In one particular aspect, a method for relevance-based document analysis and filtering includes performing, by one or more processors, one or more natural language processing (NLP) operations on one or more input documents to generate document text data. The method also includes providing, by the one or more processors, the document text data as input to one or more machine learning (ML) models to generate one or more feature vectors. The one or more ML models are trained to extract feature vectors of particular features from input documents. The particular features include an entity, a risk, and a relationship indicator representing whether a relationship between the entity and the risk exists within a corresponding document. The method includes performing, by the one or more processors, entity matching between the one or more feature vectors and an entity list to generate scores corresponding to the one or more feature vectors. Each of the scores indicates a likelihood that a respective feature vector includes an entity from the entity list. The method also includes filtering, by the one or more processors, the one or more feature vectors based on the scores to generate a subset of feature vectors. The method further includes generating, by the one or more processors, an output based on the subset of feature vectors.

In another aspect, a system for relevance-based document analysis and filtering includes a memory and one or more processors communicatively coupled to the memory. The one or more processors are configured to perform one or more NLP operations on one or more input documents to generate document text data. The one or more processors are also configured to provide the document text data as input to one or more ML models to generate one or more feature vectors. The one or more ML models are trained to extract feature vectors of particular features from input documents. The particular features include an entity, a risk, and a relationship indicator representing whether a relationship between the entity and the risk exists within a corresponding document. The one or more processors are configured to perform entity matching between the one or more feature vectors and an entity list to generate scores corresponding to the one or more feature vectors. Each of the scores indicates a likelihood that a respective feature vector includes an entity from the entity list. The one or more processors are also configured to filter the one or more feature vectors based on the scores to generate a subset of feature vectors. The one or more processors are further configured to generate an output based on the subset of feature vectors.

In another aspect, a non-transitory computer-readable storage medium stores instructions that, when executed by one or more processors, cause the one or more processors to perform operations for relevance-based document analysis and filtering. The operations include performing one or more NLP operations on one or more input documents to generate document text data. The operations also include providing the document text data as input to one or more ML models to generate one or more feature vectors. The one or more ML models are trained to extract feature vectors of particular features from input documents. The particular features include an entity, a risk, and a relationship indicator representing whether a relationship between the entity and the risk exists within a corresponding document. The operations include performing entity matching between the one or more feature vectors and an entity list to generate scores corresponding to the one or more feature vectors. Each of the scores indicates a likelihood that a respective feature vector includes an entity from the entity list. The operations also include filtering the one or more feature vectors based on the scores to generate a subset of feature vectors. The operations further include generating an output based on the subset of feature vectors.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 7 is a flow diagram illustrating an example of a method for relevance-based document analysis and filtering according to one or more aspects.

Figure 1:
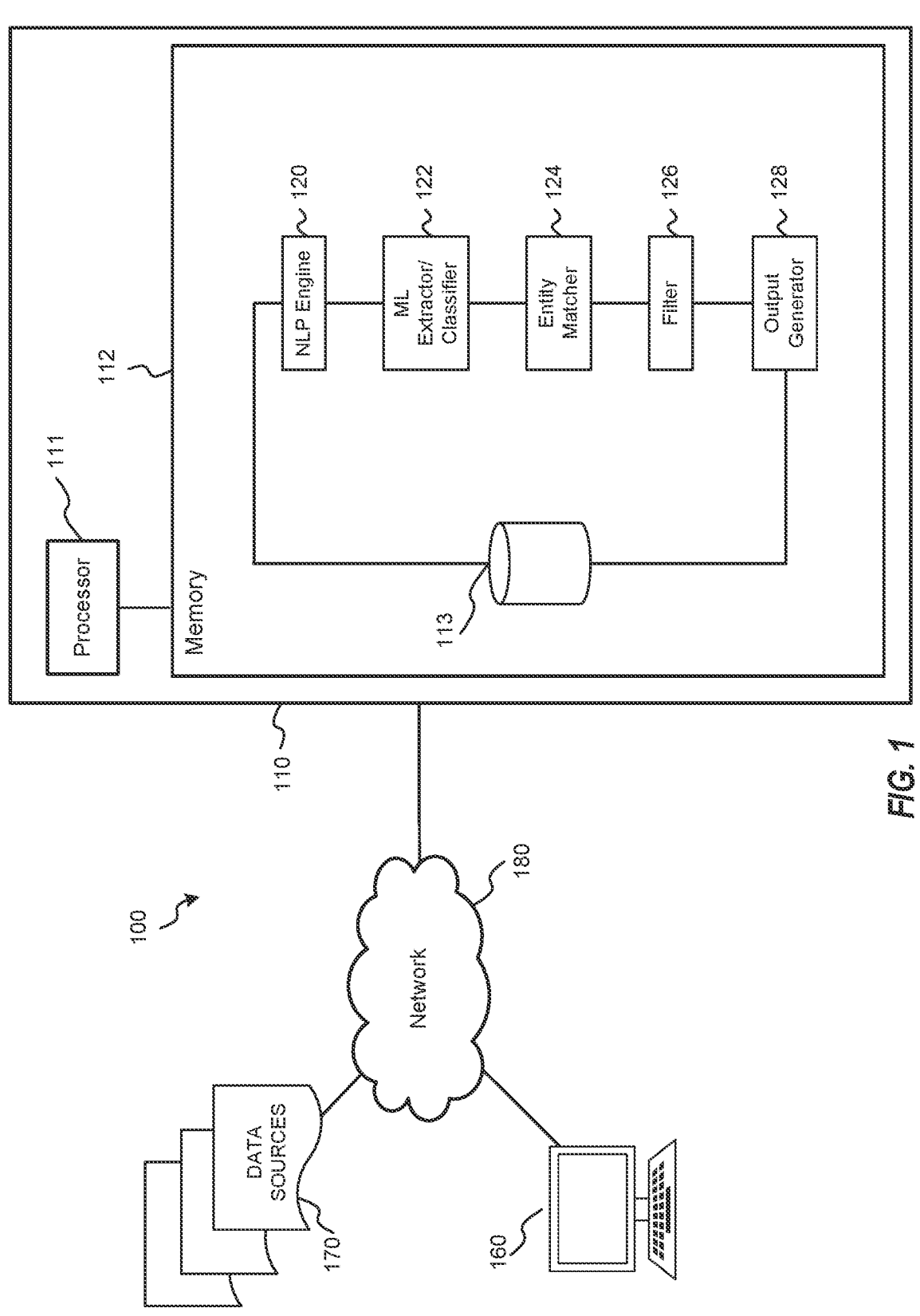
FIG. 1 is a block diagram of an example of a system that supports relevance-based document analysis and filtering according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the aspects of the disclosure in detail. It should be understood, however, that the detailed description and the specific examples, while indicating various implementations, are given by way of illustration only, and not by way of limitation. Various substitutions, modifications, additions, and/or rearrangements within the scope of the disclosure will become apparent to those skilled in the art from this disclosure.

Aspects of the present disclosure provide relevance-based analysis and filtering of documents and media for a client enterprise. The analysis and filtering of documents described herein leverage custom-built taxonomies, natural language processing (NLP), and machine learning (ML) for identifying and extracting features from highly-relevant documents for the client. For example, a server may be configured to leverage ML models that are trained to extract entities and risks relevant to a financial institution, such as a bank or brokerage, in complying with government regulations and financial rules. The extracted features are vectorized and filtered by performing entity matching (and/or risk matching), relevance scoring, and optionally based on input from one or more document experts, to provide highly relevant documents with fewer false positives than conventional manual document screening techniques or document screening systems. In some implementations, the filtered documents may be output via a graphical user interface (GUI) that includes highlighting of relevant portions (e.g., the entities and the risks) of documents that are selected to be relevant to the particular financial institution and a target set of compliance-related risks, such as embezzlement, money laundering, security and exchange commission (SEC) violations, and the like. As noted through the present application, the systems and techniques disclosed herein configure a system to present an enhanced GUI in which portions of documents relevant to compliance are displayed and highlighted, and optionally recommended actions are displayed (or initiated by an automated or semi-automated system). Thus, it should be appreciated that the techniques and systems disclosed herein provide a technical solution to technical problems existing in conventional industry practices of document and media screening and compliance. Furthermore, the techniques and systems disclosed herein implement a distinct process and a particular implementation that provide an improvement to existing computer systems by providing computer systems with new capabilities and functionality for applying ML models to extracting particular features from input documents, filtering the input documents using the extracted features to reduce the number of documents that are irrelevant or not sufficiently relevant, and outputting the filtered input documents and/or suggested actions for maintaining compliance without introducing the time, cost, and unintentional bias of manual systems or the large number of false positives and less relevant results, and overall large quantity of results, of conventional automated screening systems.

Referring to FIG. 1, an example of a system that supports relevance-based document analysis and filtering according to one or more aspects is shown as system 100. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, data (e.g., text data or documents) may be obtained from data sources 170 and may be provided as input to server 110. The various components of server 110 may cooperatively operate to perform analysis and filtering on input documents based on relevant to a particular client enterprise (e.g., a business, an organization, an agency, etc.) or an industry sector. For example, the various components of server 110 may cooperatively operate to generate processed text data from a document (e.g., by performing natural language processing (NLP)) and to use ML models to automatically extract particular features from the input documents. The various components of server 110 may also perform entity matching on feature vectors of the extracted features to filter feature vectors that do not include entities that are relevant to the client. In some implementations, risk matching may be similarly performed to filter the feature vectors. After the entity matching, the components of server 110 may score the remaining feature vectors based on estimated relevance and further filter the feature vectors based on the scores, and optionally based on user input from one or more document experts. The components of server 110 may generate an output based on documents corresponding to the filtered feature vectors. In some implementations, the output includes a graphical user interface (GUI) configured to display portions of the corresponding input documents with the respective features highlighted. As such, various aspects of the present disclosure allow adverse media screening of documents or other media to filter a large quantity of input documents into a smaller set of documents that are relevant to a particular client and to compliance-related risks associated with the particular client, as further described herein.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a GUI via which a user may be provided with information related to data and information received from server 110. For example, user terminal 160 may receive output based on a filtered list of feature vectors, and corresponding documents, from server 110. The GUI may be configured to display portions of the corresponding documents, and in some implementations, to highlight features identified in the displayed portions, such as an entity name or an identified risk. Additionally or alternatively, the GUI may indicate one or more suggested actions to take based on the filtered feature vectors and the corresponding documents. A user may review the portions of the documents and/or the suggested actions to make decisions about how to comply with regulations or rules in view of the information contained within the documents.

Data sources 170 may comprise at least one source of textual data. For example, the data source(s) may include a streaming news source, a database of articles, a news feed, a social media feed, another type of information feed, a news repository, an article repository, a news aggregator, a media aggregator, a database, a server, a data room, another data source, the like, or a combination thereof. In a particular implementation, the data from data source 170 may include or correspond to news articles relating to a particular topic, industry segment, target audience, or the like. Although described herein as documents (e.g., articles), in some other implementations, data received from data sources 170 may include audio clips, podcasts, audio streams, video clips, video streams, virtual reality data, multimedia content, interactive content, or other types of media content.

Server 110 may be configured to receive data from data sources 170, to perform NLP operations, to apply machine learning or artificial intelligence algorithms, and/or other processing to analyze and filter input documents based on client-specific relevance factors. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, natural language processing (NLP) engine 120, machine learning (ML) extractor/classifier 122, entity matcher 124, filter 126, and output generator 128. It is noted that the various components of server 110 are illustrated as single and separate components in FIG. 1.

However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing received documents or text data, NLP data, one or more feature vectors, metadata, training data, ML model parameters, entity list(s), risk list(s), scores, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), or a combination thereof.

NLP engine 120 may be configured to perform NLP based on data corresponding to input documents to generate document text data. The input documents may include news articles, financial articles, opinion articles, social media posts, aggregator reports, websites, other documents, or the like. The input documents may be related to an industry sector or other category associated with a particular client enterprise. In some implementations, the client enterprise is a financial institution, such as a bank, a stock broker, a mutual fund, a cryptocurrency investor, or the like, and the input documents may include news articles, social media, etc., about the financial services industry. In other implementations, the client enterprise may be a different type of enterprise, such as a healthcare services provider, a legal services provider, a government agency, a non-profit agency, vendor verification, supply chain or global trade agencies, other businesses, or the like. Performing NLP on the input documents may generate the document text data (e.g., NLP-processed data). The NLP process may recognize characters, words, sentences, punctuation marks, or a combination thereof, in the input documents. For example, the NLP performed by NLP engine 120 may include tokenization, lemmatization, stemming, phrasing, sentencization, part-of-speech tagging, dependency parsing, stop-character parsing, and named entity recognition, other processing operations, or a combination thereof. Although described as performing NLP operations on input documents, NLP engine 120 may also be configured to perform NLP operations on labeled documents to generate training data for use in training ML extractor/classifier 122.

ML extractor/classifier 122 may be configured to leverage one or more ML models included in, integrated in, or accessible to ML extractor/classifier 122 to extract particular features from the document text data generated by NLP engine 120 to generate one or more feature vectors. Each feature vector may correspond to a respective document, a respective paragraph of a document, or a respective differently-sized portion of one or more documents. The particular features may be preselected as features that are highly relevant to regulatory or rule compliance by the client enterprise. For example, the particular features may include an entity, a risk, and a relationship indicator for each document or portion thereof (e.g., paragraph). Such a three-element feature vector may be referred to herein as a "triple." The entity may include an enterprise name, a business name, an executive's name, a board member's name, an employee's name, a customer's name, a contractor or agent's name, a job title or rank, other names or identifiers, or a combination thereof. For names of people, the names may include a first name, a middle name, a last name, or a combination thereof. The risk may include one or more keywords that indicate a compliance risk to the client enterprise, such as an illegal or non-compliant activity for which the enterprise is responsible for taking certain actions to comply with regulations or rules. The relationship indicator represents whether a relationship between the entity and the risk exists. In some implementations, the relationship indicator may be a binary value that indicates either that a relationship between the entity and the risks exists or does not exist. Alternatively, the relationship indicator may be a more complex variable that indicates additional information, such as a type of the relationship, a status (e.g., active or expired) of the relationship, or the like. In some implementations, the entity may correspond to a subject of a sentence (or paragraph or other portion of a document), the risk may correspond to an object of the sentence, and the relationship may correspond to a predicate of the sentence that connects the subject to the object.

The compliance risks extracted from the input documents may be based on client-specific targets, such that a particular taxonomy of risks is established for extraction based on an industry sector associated with the client enterprise, the regulations or rules experienced by the client enterprise, or a combination thereof. In particular implementations described herein, the client industry is a financial institution, and the risks include various domains of financial crimes or other non-compliant activities, such as fraud and misappropriation, as non-limiting examples. In some such implementations, more general domains of criminal and non-compliant activities may be divided into financial and non-financial domains, and the financial domains may be used to define risks to be extracted from input documents, while ignoring the non-financial domains. For example, the fraud domain may be split into general fraud (e.g., non-financial fraud) and securities fraud and the misappropriation domain may be split into general misappropriation (e.g., burglary, robbery, etc.) and financial misappropriation. As non-limiting examples, securities fraud may include activities such as insider trading, manipulation of investment prices, making false or misleading disclosures, offering for sale fraudulent or unregulated securities, perpetrating fraudulent schemes, and the like, and financial misappropriation may include larceny, embezzlement, extortion, theft, and the like. Although financial risks are described in the examples herein, these examples are not limiting and in other implementations, the risks may correspond to other industries. For example, aspects of the present application may be applied in the context of healthcare service providers, and the risks may include malpractice, sale of illegal drugs, intoxication, liability, manslaughter, or the like. As other examples, aspects of the present application may be applied in the context of legal service providers, government agencies, supply chain or global trade agencies, etc., and the risks may include damages, dismissals, contempt rulings, censures, notices of disbarment, embezzlement, fraudulent impersonation of officials, impeachment, employment or background screening failures, customs fraud, violation of safety or import/export statutes, or the like.

ML extractor/classifier 122 may leverage one or more ML models that are trained to extract the particular features (e.g., the entities, risks, and relationships) from the input documents. The one or more ML models (referred to herein as "the ML models") may include or correspond to include or correspond to one or more types of AI or ML models, such as neural networks (NNs), support vector machines (SVMs), decision trees, random forests (RFs), Bayesian networks (BNs), dynamic Bayesian networks (DBNs), naive Bayes (NB) models, Gaussian processes, hidden Markov models (HMMs), other types of models, or any combination thereof. The ML models may be trained based on labeled documents, as further described herein. In some implementations, the ML models are included in or implemented by server 110. For example, after training, the ML models may be stored at and executed by server 110. In some other implementations, the ML models may be located externally to server 110. In such implementations, the document text data may be provided, such as via network 180, to an external device that executes the ML models, and server 110 may receive the feature vectors from the external device, such as via network 180. Locating the ML models externally to server 110 may reduce a memory footprint, processing resource usage, and/or power consumption at server 110.

Entity matcher 124 may be configured to perform entity matching between the feature vectors output by ML extractor/classifier 122 and an entity list (e.g., a plurality of entities) received from the client enterprise. The entity list may include one or more names or identifiers of the client enterprise, names of executives of the client enterprise, names of board members of the client enterprise, names of employees of the client enterprise, names of customers of the client enterprise, names of other parties which may be related to compliance of the client enterprise with regulations or rules, or a combination thereof. Each entity included in the feature vectors and in the entity list may include a single field or multiple fields, such as a first name, a middle name, a last name, a title, a prefix, or the like. For example, the name of the client enterprise may be "Trusted Financial," the name of an executive may be "Mr. Scrooge" (e.g., including the prefix "Mr." and the last name "Scrooge"), and the name of an employee may be "Bob Overworked Cratchet" (e.g., including the first name "Bob," the middle name "Overworked," and the last name "Cratchet").

Performing the entity matching may include comparing entities included in the feature vectors to entities included in the entity list to determine if a match occurs. A match may occur when an entity included in a feature vector has the same number of fields as an entity in the entity list and the values of each of the fields are the same, or when a threshold number of values of fields of an entity in the feature vectors are the same as values of fields in an entity included in the entity list. To illustrate, if a feature vector includes a first entity that includes a first name and a last name and an entity list includes a second entity that includes a first name and a last name, and if a match occurs when entities have the same number of fields and the same values for each field, the first entity matches the second entity if the first name of the first entity is "Gordon," the last name of the first entity is "Gekko," the first name of the second entity is "Gordon," and the last name of the second entity is "Gekko." As another example, if the first entity includes a first name, a middle name, and a last name, the second entity includes a prefix and a last name, and a match occurs when entities have at least one value of a field that is the same as a corresponding field in another entity (e.g., a threshold is one), the first entity and the second entity match if the first name of the first entity is "Bud," the middle name of the first entity is "Charlie," the last name of the first entity is "Fox," the prefix of the second entity is "Mr.," and the last name of the second entity is "Fox." In some implementations, feature vectors that include entities that match entities included in the entity list may be indicated as matches and other feature vectors may be indicated as non-matches (e.g., using a flag or other indicator).

Alternatively, entity matcher 124 may be configured to generate scores based on the comparisons between the feature vectors and the entity list. The scores may indicate a likelihood that a respective feature includes an entity from the entity list. For example, scores corresponding to feature vectors may be based on a number of fields that match or a degree of similarity between the number of fields, if the entities include the same values within the respective fields or a number of fields that include the same values, a degree of similarity between the fields, other similarity measurements, or a combination thereof. As a non-limiting example, a feature vector that includes an entity having a first name and a last name may be assigned a score of 1.0 if an entity in the entity list includes only a first name and a last name with the same values, a score of 0.5 if the entity includes only a first name and a last name with only the last name including the same value, and a value of 0.3 if the entity includes a single field that matches the first name in the feature vector. In some implementations, different types of similarities or similarity between different fields may be weighted differently. As a non-limiting example, similarity between last name fields may be weighted 0.5, similarity between first name fields may be weighted 0.3, and similarity between number of fields may be weighted 0.15.

In some implementations, in addition (or in the alternative) to performing entity matching, entity matcher 124 may be configured to perform risk matching on the feature vectors and a risk list (e.g., a plurality of risks) received from the client enterprise. For example, entity matcher 124 may be configured to perform risk matching by comparing the risks included in feature vectors to the risks included in the risk list, similar to as described above for comparing entities, to generate scores (e.g., risk scores) that indicate a likelihood that a respective feature vector includes a risk from the risk list or a flag (or other indicator) that indicates whether a risk in the feature vector matches a risk in the risk list. In this manner, a client or industry-specific risk taxonomy may be further refined based on updated or more detailed risks received from the client enterprise.

Filter 126 may be configured to filter the feature vectors based on the scores (or flags) output by entity matcher 124 to generate a subset of feature vectors (e.g., filtered feature vectors). For example, filter 126 may be configured to discard feature vectors that are indicated as non-matching, or feature vectors having a score that fails to satisfy a threshold score. As another example, filter 126 may be configured to discard a threshold number of lowest scoring feature vectors. If entity matcher 124 is further configured to perform risk matching, filter 126 may also be configured to filter the feature vectors based on scores (or flags) corresponding to risk matching performed by entity matcher 124. In some implementations, filter 126 may be further configured to generate relevance ratings based on the remaining feature vectors. The relevance ratings may be based on information received from the client enterprise (e.g., risk rankings, entity rankings, target dates, target document/data sources, or the like), information included in the corresponding input documents (e.g., article titles, number of feature vectors extracted from the same input document, weighting of an extracted entity or extracted risk, or the like), other information, or a combination thereof. Filter 126 may be configured to further filter the feature vectors based on the relevance ratings (e.g., to discard feature vectors having ratings that fail to satisfy a threshold or to discard a threshold number of lowest rated feature vectors) or to provide the relevance ratings as output. Additionally or alternatively, filter 126 may be configured to provide the filtered feature vectors to one or more client devices for review by document experts and to further filter the feature vectors based on user input received from the client devices, as further described herein.

Output generator 128 may be configured to generate an output based on the subset of feature vectors (e.g., the filtered feature vectors). The output may include identifiers of input documents that correspond to the subset of feature vectors, the input documents (or portions thereof), one or more recommended actions, an instruction to automatically perform a compliance-related activity based on entities and/or risks included in the subset of feature vectors, or a combination thereof. For example, the output may include a GUI that is configured to display portions of input documents that correspond to the subset of feature vectors (as indicated by metadata associated with the feature vectors, as further described herein). In some implementations, one or more of the entity or the risk included in a feature vector may be highlighted in the portion of the corresponding input document displayed by the GUI. For example, the GUI may display a paragraph of an article from with a first feature vector is extracted, and words corresponding to the entity and to the risk may be highlighted. In some implementations, entities are highlighted a different color than risks. Additionally or alternatively, the GUI may display one or more recommended actions to deal with the risks included in the subset of feature vectors. The GUI may be output to a display device, or may be output to another device, such as user terminal 160, as non-limiting examples. Additionally or alternatively, the output may include an instruction to automatically initiate performance of an action, and the instruction may be output to another devices, such as an automated system of the client enterprise, via network 180.

The database 113 may be coupled to NLP engine 120, ML extractor/classifier 122, entity matcher 124, filter 126, output generator 128, or a combination thereof. In some implementations, database 113 is configured to store input documents, training documents, document text data (e.g., NLP data), feature vectors, metadata, scores, rankings, other information, or a combination thereof.

Figure 2:
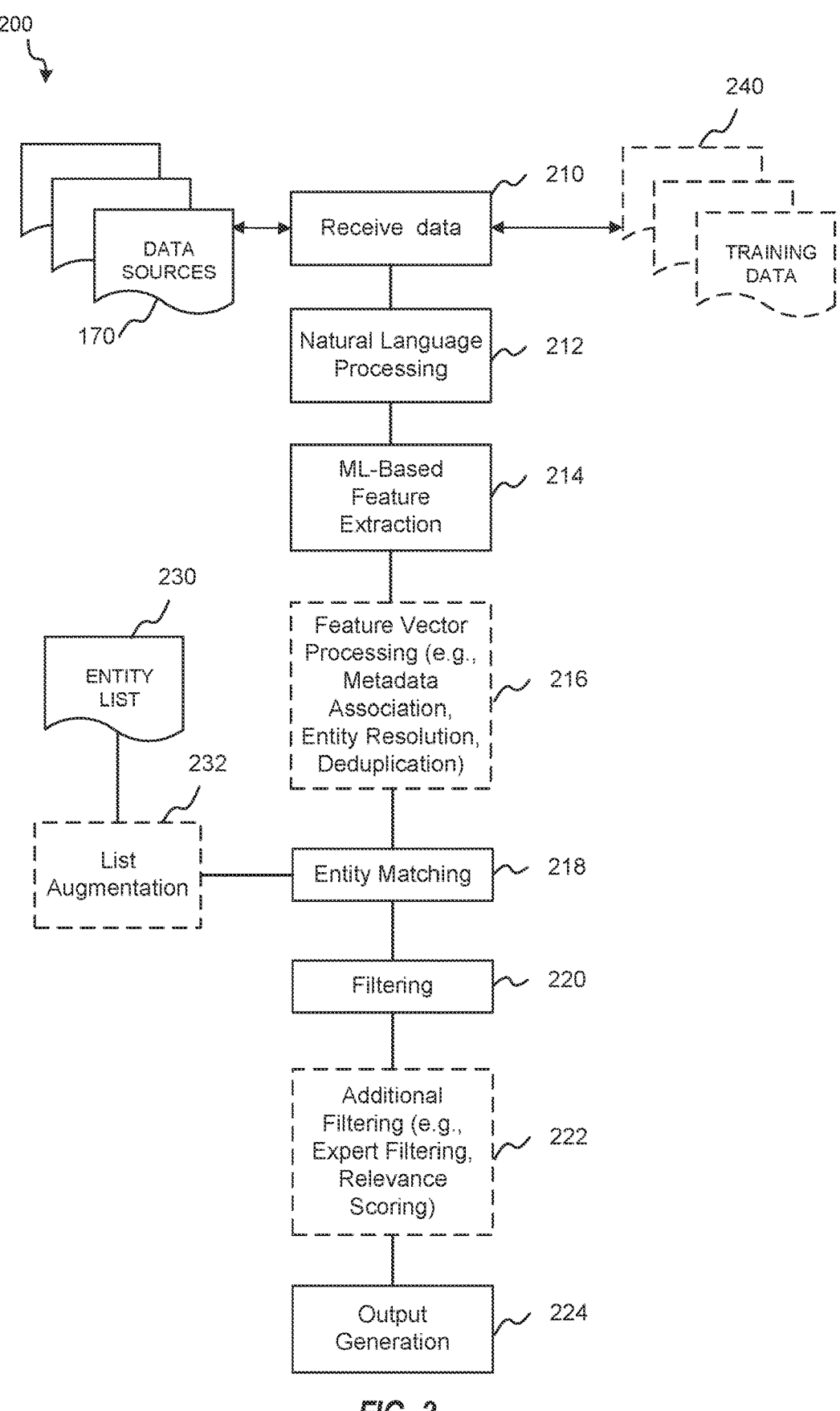
FIG. 2 is a flow diagram illustrating functionality of the system of FIG. 1 according to one or more aspects.

The functionality of server 110 will now be discussed with respect to the flow diagram illustrated in FIG. 2. FIG. 2 shows a flow diagram illustrating functionality of system 100 for performing relevance-based analysis and filtering of documents. Blocks of method 200 illustrated in FIG. 2 may be performed by one or more components of system 100 of FIG. 1. For example, blocks 210 and 212 may be performed by NLP engine 120, blocks 214 (and 216) may be performed by ML extractor/classifier 122, block 218 may be performed by entity matcher 124, blocks 220 and 222 may be performed by filter 126, block 224 may be performed by output generator 128, and block 232 may be performed by entity matcher 124.

At block 210, data is received (e.g., at a receiver). For example, the data may include or correspond to a document (or multiple documents) and may be received from data sources 170. Additionally or alternatively, the data may include or correspond to training data 240 (e.g., a labeled corpus of documents to be used to train the ML models of ML extractor/classifier 122). The different between the input documents received from data sources 170 and the training documents received as training data 240 is that the input documents are not labeled, unlike the training documents which include labels indicating entities, risks, relationship indicators, or a combination thereof. At block 212, NLP is performed on the data (e.g., the input documents or training data 240). For example, NLP engine 120 may perform one or more NLP operations on the data to generate document text data (e.g., NLP data). Performing NLP operations may identify and subdivide an input document into tokens, phrases, sentences, paragraphs, or the like.

At block 214, ML-based feature extraction is performed on the document text data to generate feature vectors. For example, ML extractor/classifier 122 may receive the document text data as input data and may generate feature vectors that include features extracted from the input documents represented by the document text data. The ML-based feature extraction may be performed by one or more ML models, such as NNs or other types of ML models, that are trained to extract particular features from documents. In some implementations, the feature vectors are triples that include entities, risks, and relationship indicators that indicate whether a relationship exists between corresponding entities and corresponding risks. The ML-based feature extraction may result in generation of different numbers of feature vectors for different input documents. For example, some input documents may result in generation of a single feature vector, as only one entity and one risk are detected within the input documents, other input documents may result in generation of multiple feature vectors because a particular input document may describe multiple entities and multiple risks, and still other input documents may result in generation of no feature vectors because these input documents do not describe any relevant entities and risks.

In some implementations, ML extractor/classifier 122 may train the ML models to extract the particular features from input documents using the training data 240. The training data 240 may include a labeled corpus of documents (e.g., a plurality of labeled documents) that include entity labels, risk labels, and/or relationship labels that correspond to a plurality of compliance-related risks for a particular industry or sector, such as the finance industry as a non-limiting example. An entity label corresponds to an entity within a document, a risk label corresponds to a risk within the document, and a relationship label indicates whether the entity and the risk are related (and in some implementations a degree of the relationship). For example, in the sentence "Bob was not convicted of embezzlement," the word "Bob" may be labeled as the entity, the word "embezzlement" may be labeled as the risk, and a relationship label may indicate that there is no relationship between the entity and the risk. The labeled corpus of documents may include documents that include labeled entities and labeled risks that have a relationship, documents that include labeled entities and labeled risks that do not have a relationship, documents that include labeled entities but no labeled risks, documents that include labeled risks but no labeled entities, and documents that do not include any labeled entities or labeled risks, in order to sufficiently train the ML models to extract entities and risks while passing over false positives. The labeled corpus of documents (e.g., the training data 240) may be labeled by document experts, one or more document processing applications, or a combination thereof. For example, a document processing application may be configured to label keywords or phrases from one or more lists or taxonomies determined for the particular client enterprise. As another example, the documents may be provided to document experts who manually label elements within the documents. In some implementations, each document may be provided to at least three document experts, and final labeling may be determined based on agreement between the document experts to eliminate individual biases or errors. If there is not agreement on a particular document, the document may be provided for further analysis to determine why disagreement occurred and to determine one or more processes or policies for guiding document experts in the review and labelling process. As such, the training data 240 may represent a "golden dataset" of training data.

NLP engine 120 may perform NLP operations on the training data 240 to generated labeled NLP data to be provided as training data to the ML models, similar to as described above for the input documents at block 212. In some implementations, the labeled NLP data may be subdivided into training data and validation data, such that after the ML models are trained, performance of the ML models may be validated using the validation data. If an accuracy or other performance metric of the ML models based on the validation data fails to satisfy a threshold, additional labeled documents may be obtained for use in further training the ML models. Although described herein as system 100 (e.g., server 110) training the ML models, in other implementations, the ML models may be trained by an external device, and trained ML parameters may be provided to server 110 for implementing the trained ML models without performing the processing and time-intensive training at server 110.

At block 216, feature vector processing or enhancement is optionally performed on the feature vectors generated by ML extractor/classifier 122. Such enhancements may be performed by ML extractor/classifier 122 (and/or other component(s) of server 110) to reduce or eliminate feature vectors that correspond to documents that cover the same subject matter or that do not correspond to entities of value, and/or to improve the utility of the feature vectors for generating useful output. In some implementations, the enhancement operations (e.g., additional feature vector processing) includes metadata association, entity resolution, deduplication, or a combination thereof. Metadata association may include associating metadata with each of the feature vectors to identify which input documents correspond to which feature vectors. For example, metadata may be generated that includes an identifier, a pointer, or the like, that identifies a first input document from which features included in a first feature vector are extracted, and the metadata may be associated with the first feature vector for use in retrieving the first input document if the first feature vector remains after filtering is performed. Additionally or alternatively, the metadata may include a paragraph identifier corresponding to a paragraph within an input document from which the features are extracted, token or word counts corresponding to location of the features within the paragraph or document, confidence scores associated with the extracted features, other information, or a combination thereof.

Entity resolution may be performed to distinguish between entities having the same name or identifier. For example, entity resolution may be performed to differentiate one or more entities included in one or more feature vectors based on corresponding risks included in the one or more feature vectors, other information included in the one or more input documents corresponding to the one or more feature vectors, or a combination thereof. As a non-limiting example, two feature vectors may include an entity "Nick Naylor," and entity resolution may be performed to determine whether the two entities are the same entity or different entities. To illustrate, entity resolution may include comparing the risks included in the two feature vectors, and if the risks are the same or sufficiently similar (e.g., insider trading and SEC violation, as a non-limiting example), the entity resolution may resolve the two entities as being the same entity. Additionally or alternatively, entity resolution may include analyzing the documents (or portions thereof) that correspond to the feature vectors to distinguish the entities. To illustrate, entity resolution may include comparing dates or timestamps corresponding to the input documents, titles and/or keywords corresponding to the input documents, other keywords or phrases related to the entities in the input documents, or a combination thereof, to determine whether the entities are the same or different entities. For example, if a first input document is a news article dated Oct. 31, 2020 and the sentence or paragraph that includes "Nick Naylor" also includes the entities "Jeff Megall" and "Polly Bailey," and a second input document is a news article dated Oct. 31, 2020 and the sentence or paragraph that includes "Nick Naylor" also includes the entity "Jeff Megall," the entity resolution may resolve that the two "Nick Naylor" entities are the same entity. As another example, if the first input document includes the phrase "Chief Executive Officer Nick Naylor" and the second input document includes the phrase "high school student Nick Naylor," the entity resolution may resolve that the two "Nick Naylor" entities are different entities. In some implementations, performing the entity resolution may assign each unique entity a permanent identifier (ID), such that entities that are resolved to be the same are assigned the same permanent ID. In some such implementations, the permanent IDs may be stored at server 110 or another location for use in future entity resolution operations.

In some implementations, performing entity resolution may include determining the IDs (e.g., permanent IDs) that correspond to the entities and associating additional information, such as additional entity fields, with the entity based on the IDs. As an example, an entity extracted from an input document, "Naylor and Associates, LLC" may be associated with an ID stored at server 110. The entry for the ID may also include additional fields, such as a second enterprise name "Naylor & Assocs," an address "1234 East Side Lane, Chicago, IL," an executive "Nick Naylor," other fields or information, or the like. The information associated with the ID may be used to perform entity resolution (e.g., to identify any duplicate entities based on the information in addition to the extracted entity "Naylor and Associates, LLC") or for use in performing one or more comparisons described with reference to the entity matching at block 218.

Deduplication may be performed to discard feature vectors that correspond to input documents that cover the same subject matter as other feature vectors (e.g., duplicate articles from different sources or the like). For example, one or more deduplication operations may be performed on the feature vectors to remove at least one feature vector having at least a same entity and a same risk as another feature vector of the one or more feature vectors. To illustrate, if two feature vectors include the exact same entity and risk (e.g., words or phrases extracted as the entities and risks), one of the feature vectors may be discarded. For example, if a first feature vector includes "Nick Naylor" and "embezzlement" as the entity and the risk, respectively, and a second feature vector includes "Nick Naylor" and "embezzlement" as the entity and the risk, respectively, the second feature vector may be discarded. In some implementations, deduplication operations may include comparing permanent IDs associated with entities to determine a match, and if the risks are the same or sufficiently similar, discarding one or more feature vectors. Additionally or alternatively, if the entities and the risks in two feature vectors are sufficiently similar (e.g., have similarity scores that satisfy a threshold), one of the feature vectors may be discarded. For example, if the first feature vector includes "Mr. Naylor" and "embezzlement" as the entity and the risk, respectively, and the second feature vector includes "Nick Naylor" and "misappropriation of funds" as the entity and the risk, respectively, the second feature vector may be discarded based on a similarity score comparing "Mr. Naylor" and "Nick Naylor" and a similarity score comparing "embezzlement" and "misappropriation of funds" satisfying a threshold.

At block 218, entity matching is performed on the feature vectors to score the feature vectors based on likelihood of matches between entities included in the feature vectors and target entities of interest for the client enterprise. For example, entity matcher 124 may perform entity matching between the feature vectors and an entity list 230 to generate scores corresponding to the one or more feature vectors. Entity list 230 may be received from the client enterprise and may indicate entities of particular interest from a compliance perspective, such as one or more names or identifiers of the client enterprise, executives of the client enterprise, board members of the client enterprise, employees of the client enterprise, contractors or agents of the client enterprise, customers of the client enterprise, individuals or organizations associated with particular risks, other entities, or a combination thereof. To perform the entity matching, a value of an entity in a feature vector may be compared to each entity in the entity list 230 to determine whether a match occurs. The match may be an exact match, or a similarity score that satisfies a threshold. For example, an feature vector that includes a particular name may be determined to match an entity in entity list 230 if the name is the same as the name in the entity list except for the transposing of two letters (e.g., due to a spelling error in the input document). In some implementations, the score may be a binary value that indicates whether an exact match occurs, such as a first value indicating that the entities match and a second value indicating that the entities do not match. In some other implementations, the score may be a value selected within a particular range where a lower bound indicates a high likelihood that there is no match between the entities and an upper bound indicates a high likelihood that there is a match between the entities, such as a value between 0 and 1, 0 and 10, or 0 and 100 as non-limiting examples.

In some implementations, the entities may include multiple fields, and the entity matching may include comparing one or more (or an entirety) of the fields of the entity in the feature vector to the entities in entity list 230. For example, the entities may include a first name, a middle name, a last name, a title, or a combination thereof, and a match may be determined based on one or more of the fields in the entity in the feature vector being the same as one or more fields of an entity in entity list 230. In some implementations, the score for a first entity included in a first feature vector may be based on a number of fields that match between the first entity and an entity in entity list 230, a degree of similarity between the fields of the first entity and the entity in entity list 230, or a combination thereof. For example, a score that compares two entities that have two fields that include the same values may be lower than a score that compares two entities that have three fields that include the same values.

In some implementations, block 218 may also include performing risk matching on the feature vectors to generate risk scores indicating likelihood of matches between risks included in the feature vectors and target risks of interest for the client enterprise. For example, entity matcher 124 may perform risk matching between the feature vectors and a risk list to generate scores corresponding to the one or more feature vectors. The risk list may be received from the client enterprise and may indicate risks of particular interest from a compliance perspective, such as particular illegal activities or non-compliant activities. The risk scores may be generated similarly to how the entity scores are generated.

In some implementations, at block 232, list augmentation may optionally be performed prior to performing the entity matching. List augmentation may add one or more one or more entities to entity list 230 to augment the entities to include names or fields that are related to names of entities in entity list 230. To illustrate, entity matcher 124 may access one or more data sources to determine one or more additional entity names or field entries. The one or more data sources may include business webpages, publically available names and employment databases, proprietary names databases, social media, or the like. The available names may include missing fields, such as a missing first name or middle name for an entity identified by only a last name, different spellings or abbreviations of names, aliases, other identifications, or a combination thereof. For example, if entity list includes a first entity having a last name of "Wayne," the data sources may be accessed to determine that a first name of the first entity is "Bruce." As another example, if a second entity has a business name "Wayne Enterprises," the data sources may be accessed to determine that additional names that correspond to the second entity are "Wayne Ent.," "Wayne Enterprises, LLC," and "WYNE" (e.g., a stock market ID). After determining the additional entity names or field entries, entity matcher 124 may augment entity list 230 to include the additional entity names or field entries prior to performing the entity matching. In this manner, entity list 230 may be augmented to include additional names of entities to avoid discarding potentially relevant feature vectors due to the client enterprise only incorporating one of multiple names or fields for each entity in entity list 230.

At block 220, filtering is performed on the feature vectors based on the scores to generate a subset of feature vectors (e.g., filtered feature vectors). For example, filter 126 may perform filtering on the feature vectors to reduce the number of feature vectors, thereby reducing a memory footprint and processing associated with the subset of feature vectors, as well as providing the most relevant feature vectors. The filtering may include discarding one or more feature vectors based on the scores. In some implementations, the filtering includes discarding feature vectors corresponding to scores that fail to satisfy a score threshold, discarding a threshold number of lowest scoring feature vectors, or a combination thereof. For example, if the scores range between 0 and 1, the filtering may include discarding any feature vectors having a score that is less than 0.5. As another example, the filtering may include discarding all but the twenty highest-scoring feature vectors. In some implementations, the scores are a binary value indicating that a match exists between the feature vectors and an entity in entity list 230 or that a match does not exist, and in such implementations the filtering may include discarding all feature vectors having a score that corresponds to a match not existing with entity list 230.

At block 222, additional filtering is optionally performed. For example, filter 126 may perform additional filtering operations on the subset of feature vectors to further filter the subset of feature vectors. In some implementations, the additional filtering operations include relevance-based rating and filtering, filtering based on input from document experts, or a combination thereof. To perform relevance-based rating and filtering, filter 126 may generate relevance ratings based on the scores of the subset of feature vectors, the feature vectors, information in the input documents that correspond to the subset of feature vectors, or a combination thereof. As an example, the subset of feature vectors may be assigned to sub-ranges based on the scores (e.g., the entity scores, the risk scores, or a combination thereof), and each sub-range may be assigned a different relevance rating. For example, if the subset of feature vectors have scores between 0.5 and 1.0, the range 0.5-1.0 may be divided into three sub-ranges: a first sub-range from 0.5-0.69, a second sub-range from 0.7-0.89, and a third sub-range from 0.9-1.0. Feature vectors in each sub-range may be assigned a corresponding relevance rating: feature vectors in the first sub-range may be assigned a relevance rating of 3, feature vectors in the second sub-range may be assigned a relevance rating of 5, and feature vectors in the third sub-range may be assigned a relevance rating of 10. As another example, each entity value, risk value, and/or relationship value may be assigned a corresponding weight based on an importance to the client enterprise, and the relevance rating of a feature vector may be based on a combination of the weights for the feature vector. As another example, the relevance rating may be based on a total number of feature vectors that are extracted from the same input document (e.g., a feature vector extracted from an input document yielding three feature vectors may have a higher relevance rating than a feature vector extracted from an input document that yields a single feature vector), based on the data source from which input documents are obtained, based on a type of input document (e.g., a news article may correspond to a higher relevance rating than a social media post, as a non-limiting example), based on other keywords included in the input document, based on other factors, or a combination thereof.

To perform filtering based on input from document experts, filter 126 may initiate transmission of the subset of feature vectors, and the input articles corresponding to the subset of feature vectors, to one or more client devices (e.g., user terminal 160) for display to one or more document experts. The document experts may manually review the documents (and the extracted features) to determine whether the extracted features are correct and a relevance rating for the document, which the document experts may indicate via user input. The relevance ratings for the feature vectors may be updated based on the relevance ratings received via the user input (e.g., by averaging, overwriting, or the like, the server-generated relevance ratings if such ratings are generated). In some implementations, each feature vector may be provided to a device for review by one document expert. Alternatively, each feature vector may be provided to multiple devices for review by multiple document experts, and the relevance ratings from the multiple document experts may be combined (e.g., via an average, a weighted average, etc.) to generate aggregated relevance ratings to assign to the feature vectors. In some implementations, the subset of feature vectors are further filtered based on the relevance ratings. For example, feature vectors having relevance ratings that fail to satisfy a threshold may be discarded, or a threshold number of lowest-rated feature vectors may be discarded, similar to filtering based on the entity scoring described above. Additionally or alternatively, the relevance rating may be included in the feature vectors or in associated metadata for use in generating output.

At block 224, output is generated based on the subset of feature vectors. The output may include document identifiers of the input documents that correspond to the subset of feature vectors (e.g., the filtered feature vectors) output by filter 126, or the output may include the input documents themselves (or portions thereof). Additionally or alternatively, the output may include one or more recommended actions to be taken to improve compliance based on the subset of feature vectors. To illustrate, output generator 128 may generate a GUI configured to display an input document (or a portion thereof) that corresponds to a feature vector included in the subset of feature vectors. For example, the GUI may display a paragraph of an input document from which the features in the feature vector are extracted from to enable a user to read a relevant portion of the input document. The input document may be retrieved from a data source or other storage location based on a document ID included in metadata associated with the feature vector, or in other manners. In some implementations, the various features may be highlighted or otherwise visually indicated. For example, the words or phrases that correspond to the entity may be highlighted with a first color and the words or phrases that correspond to the risk may be highlighted a second color. As another example, visual indication (e.g., a check box, a font style, a text color, etc.) may be displayed to indicate the relationship indicator in the feature vector. Additionally or alternatively, the GUI may be configured to display one or more recommended actions, such as scheduling a meeting with an entity identified in the input document, transmitting an e-mail or text message to board members to call a meeting of the board, performing an online or database search for additional information related to an input document, or the like, to resolve the compliance-related risk indicated by the input document. The output (e.g., the GUI) may be displayed via a display device coupled to or integrated within server 110, or sent to one or more other devices, such as user terminal 160, for display to a user.

In some implementations, the output may include an instruction to automatically perform a compliance-related activity based on one or more entities, one or more risks, or both, included in the subset of feature vectors. For example, the instruction may cause retrieval of additional information, such as employee records or the like, that correspond to an entity included in the subset of feature vectors. As another example, the instruction may cause scheduling of a meeting with an entity included in the subset of feature vectors using a calendar application. As another example, the instruction may cause an Internet or database search for regulations or rules that correspond to a risk included in the subset of feature vectors. The above examples are not intended to be limiting, and other automatic or computer functions are possible for the instruction. The instruction (e.g., the output) may be executed by server 110 or sent to another device (e.g., user terminal 160) or another automated or semi-automated device or system of the client enterprise.

As described with reference to FIGS. 1-2, system 100 (e.g., server 110) and its corresponding operations and functions provide analysis and filtering of input documents based on relevance and for client enterprise-specific compliance risks. For example, system 100 is configured to present an enhanced GUI in which portions of documents relevant to compliance with financial industry rules and government regulations (or other regulations and rules) are displayed and highlighted, allowing a user to quickly receive the most relevant documents from a large quantity of input documents that would otherwise require significant number of personnel to review as part of a costly and inefficient compliance review team. Additionally, due to biases and time constraints, documents reviewed by the personnel may result in missed documents or improperly identified documents, which may cause non-compliance with the regulations resulting in fines, litigation, sanctions, or legal action against the client enterprise. Such negative occurrences may degrade the reputation and operating capabilities of the client enterprise. Additionally, because server 110 is configured to filer input documents based on feature vectors using industry-specific and compliance-risk related taxonomies and entity lists from the client enterprise, the documents identified by output of server 110 have significantly fewer false positive results and are more relevant than documents identified using conventional document analysis applications and systems. Thus, it should be appreciated that the techniques described with reference to FIGS. 1-2 provide a technical solution to technical problems existing in conventional industry practices of document and media screening and compliance. Furthermore, system 100 and method 200 implement a distinct process and a particular implementation that provide an improvement to existing computer systems by providing system 100 with new capabilities and functionality for applying ML models to extracting particular features from input documents, filtering the input documents using the extracted features to reduce the number of input documents that are irrelevant or not sufficiently relevant, and outputting the filtered input documents and/or suggested actions for maintaining compliance without introducing the time, cost, and unintentional bias of manual systems or the large number of false positives and less relevant results, and overall large quantity of results, of conventional automated screening systems.

Figure 3:
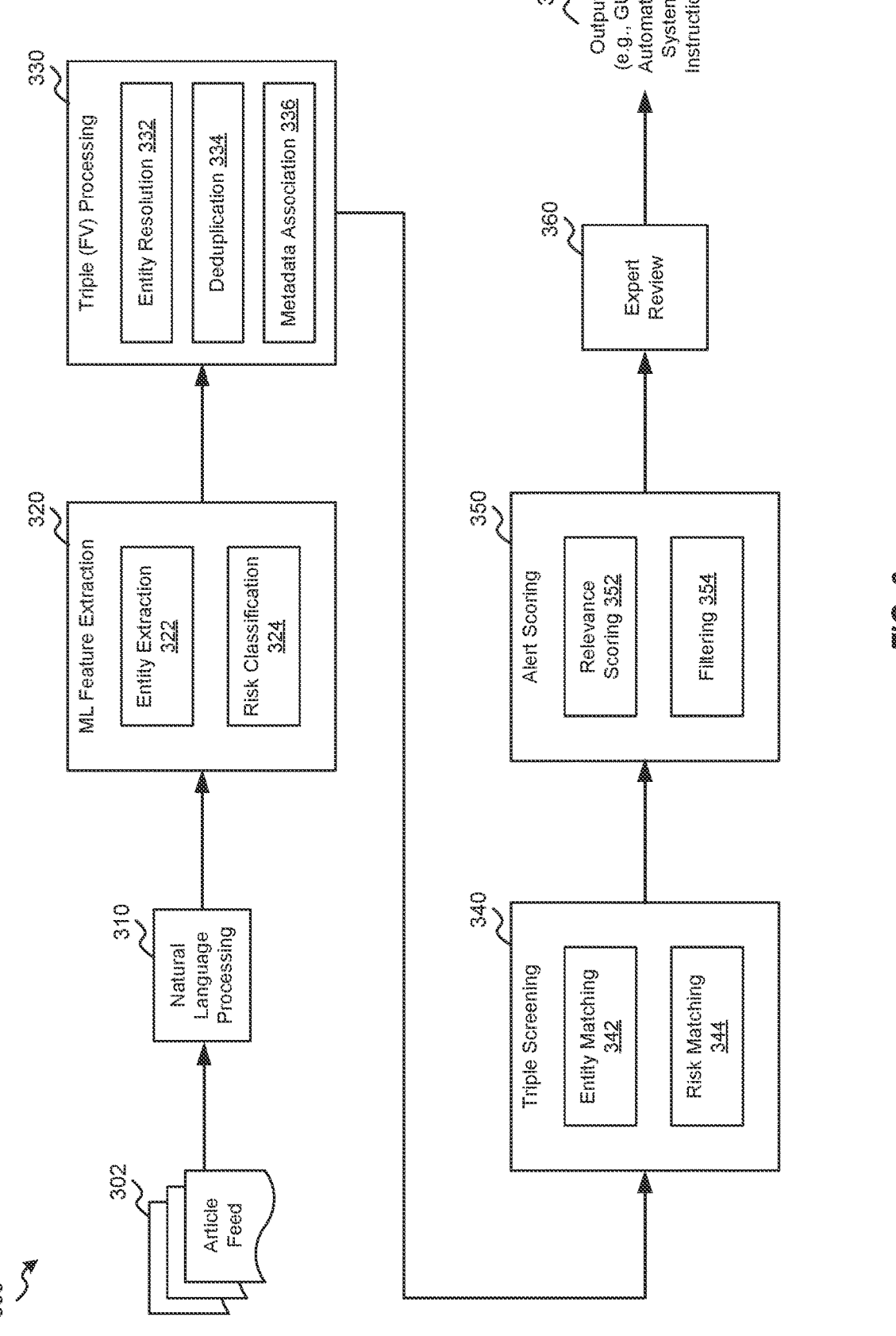
FIG. 3 is a block diagram of an example of a system that supports article analysis and filtering according to one or more aspects.

Referring to FIG. 3, an example of a system that supports article analysis and filtering according to one or more aspects is shown as a system 300. In some implementations, system 300 may include or correspond to system 100 of FIG. 1 (or portions thereof). As shown in FIG. 3, system 300 includes natural language processing 310, ML feature extraction 320, triple processing 330 (e.g., feature vector processing), triple screening 340, alert scoring 350, and expert review 360. Although some of the components of system 300 are named for their functionality, the components may include processors, cores, circuitry, logic, or other hardware or physical components configured to execute instructions to perform the functionality described herein.

Natural language processing 310 may be configured to perform NLP operations on one or more input articles to generate NLP data (e.g., document text data). ML feature extraction 320 may be configured to perform entity extraction, risk extraction, or both, on NLP data to extract entities, risks, relationships between the entities and risks, or a combination thereof, for use in generating triples. For example, ML feature extraction 320 may include entity extraction 322 configured to perform entity extraction to extract entities from input documents and risk classification 324 to extract (e.g., classify) risks indicated by input documents. In some implementations, entity extraction 322 and/ or risk classification 324 may include or correspond to trained ML models, such as the ML models described with reference to ML extractor/classifier 122 of FIG. 1.

Triple processing 330 may be configured to process triples (e.g., three-element feature vectors) to enhance the triples with metadata and to eliminate some triples. In some implementations, the triples may each include an entity, a risk, and a relationship indicator for a relationship between the entity and the risk. To illustrate, triple processing 330 may include entity resolution 332, deduplication 334, and metadata association 336. Entity resolution 332 may be configured to perform entity resolution on triples to distinguish or differentiate multiple triples having the same (or similar entities), such as by assigning permanent or global IDs to entities/ triples. Deduplication 334 may be configured to perform deduplication operations on triples to discard (e.g., eliminate) one or more triples that correspond to articles covering the same subject matter as articles corresponding to other triples. Metadata association 336 may be configured to associate metadata with the triples, such as metadata that indicates document IDs of documents corresponding to the triples, paragraph IDs of paragraphs that include entities and/or risks in the triples, token locations or counts, confidence values, other information, or a combination thereof.

Triple screening 340 may be configured to screen triples based on entities, risks, or both, received from a client enterprise. For example, triple screening 340 may include entity matching 342 configured to perform entity matching on the triples and an entity list received from a client enterprise and risk matching 344 configured to perform risk matching on the triples and a risk list received from the client enterprise. The entity matching may include comparing entities included in the triples to entities included in the entity list to determine scores (e.g., entity scores), as described above with reference to FIGS. 1-2. The risk matching may include comparing risks included in the triples to risks included in the risk list to determine scores (e.g., risk scores), as described above with reference to FIGS. 1-2.

Alert scoring 350 may be configured to perform additional scoring (e.g., rating) based on relevance and to filter triples based on the scores. To illustrate, alert scoring 350 may include relevance scoring 352 and filtering 354. Relevance scoring 352 may be configured to generate relevance ratings for triples based on information such as the risks included in the triples, weights associated with the entities and/or the risks included in the triples, keywords or phrases included in the articles from which the triples are extracted, timestamps, dates, or other parameters of the articles from which the triples are extracted, or the like. Additionally or alternatively, relevance scoring 352 may convert scores for triples from a first format (e.g., output by triple screening 340) to a second format (e.g., a more user-friendly format). As an example, triple screening 340 may output scores between 0.00 and 1.00, particularly between 0.30 and 1.00 for most triples, and relevance scoring 352 may convert these scores to a percentage value between 0% and 100%. Filtering 354 may be configured to filter the triples based on the scores (e.g., the entity scores, the risk scores, the relevance ratings, or a combination thereof), such as by discarding triples having scores that fail to satisfy a threshold or by discarding a threshold number of lowest-scoring triples, as non-limiting examples.

Expert review 360 may be configured to provide filtered triples to user terminals or other devices for manual review by one or more document experts. The document experts may provide additional review that identifies erroneously identified articles (e.g., false positives) or less relevant articles, thereby further enhancing the filtering provided by system 300. The document experts may provide instructions or ratings via user input to the user terminals, and the triples may be further filtered based on the user input.

During operation of system 300, one or more articles (typically a large volume of articles) may be obtained from article feed 302 and provided as input to natural language processing 310. In some implementations, article feed 302 includes or corresponds to a news feed, a social media feed, article databases, or the like. As a particular, non-limiting example, article feed 302 may include or correspond to a proprietary news aggregator that receives and vets articles from more than 12,000 sources. Natural language processing 310 may perform NLP operations on the articles from article feed 302 to generate NLP data. ML feature extraction 320 may receive the NLP data from natural language processing 310 and extract features from the NLP data, using trained ML models, to generate multiple triples (e.g., feature vectors). To illustrate, entity extraction 322 may perform entity tagging and entity mapping to extract entities from paragraphs (sentences, or other portions) of articles, the entities representing a subject (e.g., "who is mentioned"). Risk classification 324 may use a risk-specific taxonomy to identify and extract words and phrases that indicate a compliance-based risk to the client enterprise. The taxonomy may be developed by one or more word processing applications, using manual review, or a combination thereof.

Triple processing 330 may receive the triples from ML feature extraction 320 and perform additional processing (e.g., enhancement) on the triples. For example, entity resolution 332 may perform entity resolution to distinguish one or more same-named entities (and in some implementations to assign global IDs to various entities), deduplication 334 may discard one or more triples corresponding to articles with duplicate subject matter (e.g., covering the same news item, event, etc.) as articles corresponding to other triples, and metadata association 336 may associate document IDs, paragraph IDs, and such, as metadata with the triples. Although shown in FIG. 3, in some other implementations, triple processing 330 (and the operations thereof) are optional (and may not be included).

Triple screening 340 may perform entity matching, risk matching, or both on the triples output by ML feature extraction 320 (and optionally processed by triple processing 330) to score the triples for filtering. To illustrate, entity matching 342 may match entities in the triples to entities in the entity list from the client enterprise to score triples based on subjects of interest, and risk matching 344 may match risks in the triples to risks in the risk list from the client enterprise to score triples based on risks of interest. Alert scoring 350 may rate the triples based on relevance and filter the triples based on the scores (e.g., the entity scores, the risk scores, the relevance ratings, or a combination thereof). To illustrate, relevance scoring 352 may generate relevance ratings for the triples that indicate a likelihood of relevancy to the client enterprise, and filtering 354 may filter out (e.g., discard) triples that have low scores, such as by discarding a threshold number of lowest-scoring triples or discarding triples having a score that fails to satisfy a score threshold. The remaining triples (e.g., a subset of filtered triples) may be provided for generating output/alerts. In some implementations, expert review 360 may optionally provide the subset of triples to user terminals of document experts for manual vetting to further reduce false positive or less relevant results. Although shown in FIG. 3, in some other implementations, expert review 360 is optional (and may not be included). The filtered subset of triples output by alert scoring 350 (or optionally expert review 360) are used to generate output 370. For example, output 370 may include a GUI that is configured to display portions of articles that correspond to the subset of triples, optionally with the entities and the risks highlighted. As another example, output 370 may include an instruction to perform one or more actions based on the subset of triples, such as actions of an automated or semi-automated system to compensate for the risks identified in the subset of triples. Thus, system 300 is configured to analyze and filter articles for article feed 302 in a manner that is faster and results in fewer false positive results than other systems or techniques, and that generates output 370 that may deliver curated alerts to a financial institution (e.g., the client enterprise) in a desired format for use in making informed decisions to respond to compliance related risks.

Figure 4:
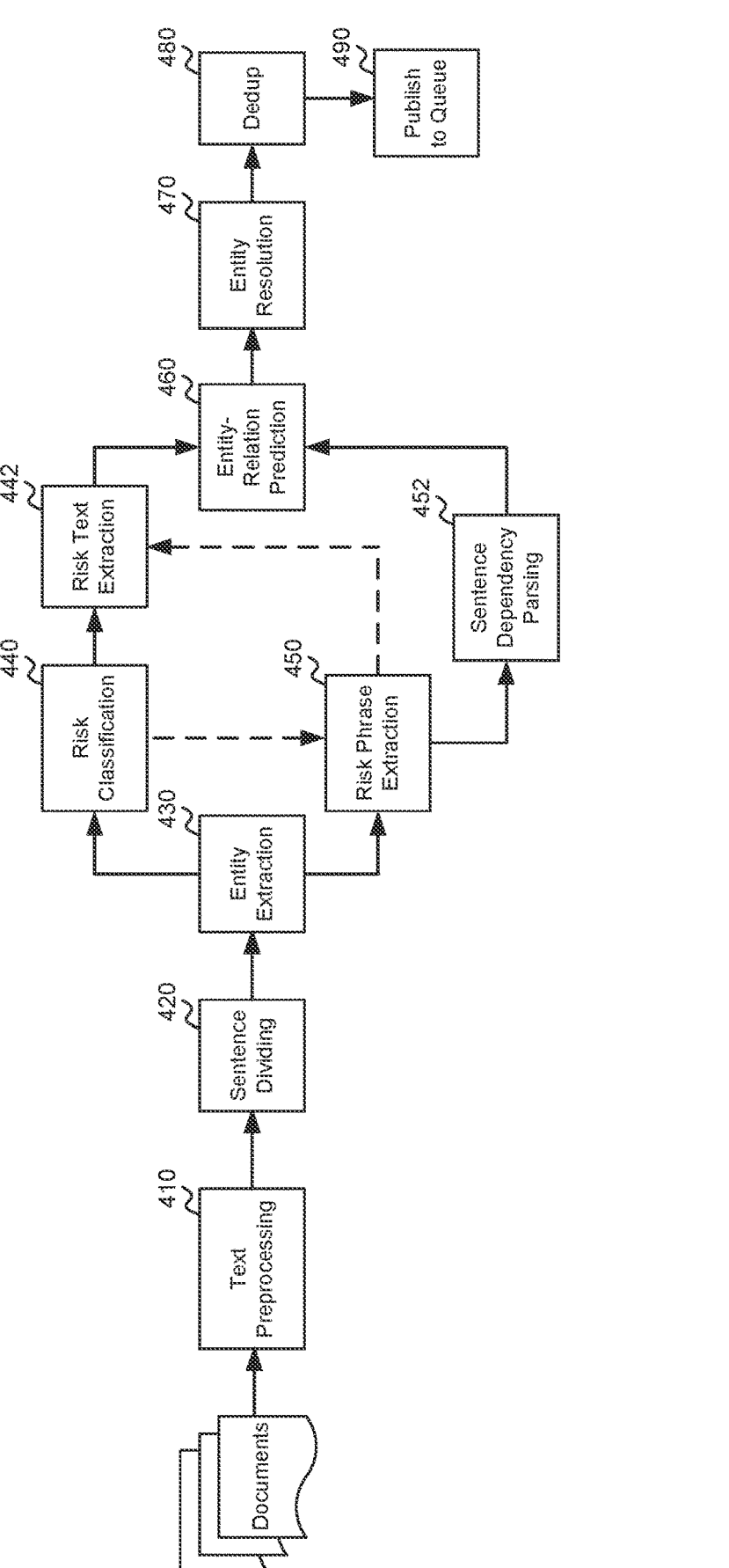
FIG. 4 is a flow diagram of an example of a process for performing entity and risk extraction according to one or more aspects.

Referring to FIG. 4, an example of a process for performing entity and risk extraction according to one or more aspects is shown as a process 400. In some implementations, operations described with reference to process 400 may include or correspond to operations described with reference to method 200 of FIG. 2 or to operations performed by system 100 of FIG. 1 or system 300 of FIG. 3.

Process 400 includes performing text preprocessing on input documents, at block 410. The text preprocessing may include or correspond to formatting operations, data cleaning operations, pre-NLP operations, or the like, and the input documents may include or correspond to articles from article feed 302 of FIG. 3 or input documents described with reference to FIGS. 1-2. Sentence dividing is performed on the preprocessed data, at block 420, to divide the preprocessed data into sentences. In other implementations, the input documents may be divided into other sized portions, such as phrases, paragraphs, or the like. Entity extraction is performed on the sentences, at block 430, to identify (and extract) entities and co-references across the text of the input documents. The entity extraction may be performed using one or more trained ML models. The extracted entities and the text data are used to perform risk classification, at block 440. For example, keywords or phrases indicating risks are identified within the text data. The risk classification may be performed using one or more trained ML models. In some implementations, the risk calculation may be performed using a confusion matrix based on risks in a taxonomy and identified risks in documents. Risk phrase extraction is performed, at block 450, on the text data to extract risk phrases that are relevant to a client enterprise. Risk phrase extraction may extract more than just a single keyword or few keywords, instead extracting other words in the text to enhance the ability to predict the risk and match the risk to the subject (e.g., the entity). Risk text extraction may be performed on the text, at block 442. For example, a span of text containing the risk may be extracted (e.g., based on the classified risk and the identified risk phrase). The extracted entities (e.g., from block 430) and the extracted risk text (e.g., from block 442) are provided as input to predict relationships between entities and risks. Additionally, sentence dependency parsing is performed, at block 452. The sentence dependency parsing may be performed on the extracted entities, the extracted risk phrases, and the text data to perform grammatical analysis of the sentences to identify the subject (e.g., entity) of the text and how it is related to the risk. The relationships determined by the sentence dependency parsing are also provided as input to predict relationships between the entities and the risks.

Entity-relation prediction is performed, at block 460. The prediction is performed to match a subject (e.g., an entity, such as a person, an enterprise, an organization, etc.) to the object (e.g., a risk) within the text and to predict whether a relationship exists between the subject and the object. Performing the entity-relation prediction generates feature vectors (e.g., triples) containing entities, risks, and relationship indicators. Entity resolution is performed, at block 470, on the feature vectors. The entity resolution may resolve entities that have the same or similar entity name. In some implementations, proprietary entity identification tools may be used to identify and assign IDs to entities. Deduplication is performed, at block 480. For example, one or more feature vectors that correspond to input documents having the same subject as input documents correspond to other feature vectors may be discarded. To illustrate, a feature vector output by the entity-relation prediction may be matched against other feature vectors to identify repetition of subject matter (e.g., an article, a story, etc.) and to condense the output by discarding duplicate feature vectors. The remaining feature vectors (e.g., triples) are published to a queue, at 490. The feature vectors published to the queue may be used in entity matching and filtering operations to generate a subset of feature vectors, as described above with reference to FIGS. 1-3.

Figure 5:
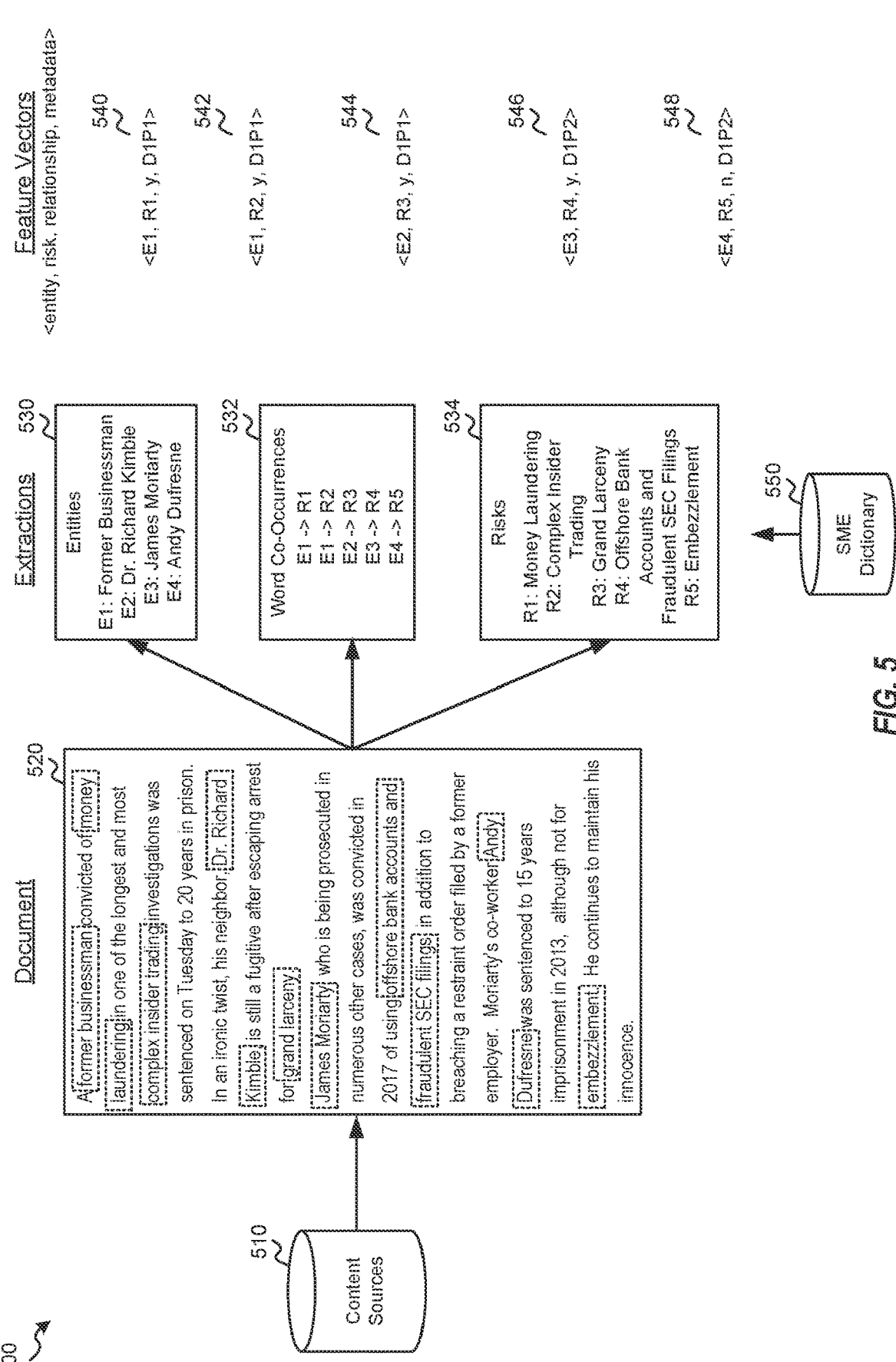
FIG. 5 illustrates an example of entity and risk extraction according to one or more aspects.

FIG. 5 illustrates an example 500 of entity and risk extraction according to one or more aspects. The example 500 shown in FIG. 5 is illustrative, and particular aspects of the example 500 are not intended to be limiting. For example, in other examples, the text of articles, the names of entities, risks, and the like, may have other values. As shown in FIG. 5, a document 520 may be obtained from content sources 510, such as one or more data sources, one or more news feeds, one or more article feeds, one or more social media feeds, servers, streaming media providers, or the like. Document 520 may be provided to one or more ML models that are trained to extract particular features from documents, such as entities, risks, and relationships, as a non-limiting example. For example, the extractions may include entities 530, word co-occurrences 532, and risks 534. In some implementations, the one or more ML models may be trained using, or have access to, a subject matter expert (SME) dictionary 550, including a client enterprise-specific taxonomy of risks to be extracted from documents.

Entities 530 may include names of enterprises, organizations, individuals, etc., that are the subject of sentences. In the example shown in FIG. 5, entities 530 include a first entity (E1) "former businessman," a second entity (E2) "Dr. Richard Kimble," a third entity (E3) "James Moriarty," and a fourth entity (E4) "Andy Dufresne." Risks 534 may include words or phrases that represent compliance risks, such as compliance risks to a financial institution, and that are the object of sentences. In the example shown in FIG. 5, risks 534 includes a first risk (R1) "money laundering," a second risk (R2) "complex insider trading," a third risk (R3) "grand larceny," a fourth risk (R4) "offshore bank accounts and fraudulent SEC filings," and a fifth risk (R5) "embezzlement." Word co-occurrences 532 includes co-occurrence indicators that indicate co-occurrence of the entities 530 and the risks 534 in the same sentences. In the example shown in FIG. 5, the first entity occurs in the same sentence as the first risk and the second risk, the second entity occurs in the same sentence as the third risk, the third entity occurs in the same sentence as the fourth risk, and the fourth entity occurs in the same sentence as the fifth risk.

The extractions may be used to generate one of more feature vectors. In some implementations, the feature vectors may be "triples" that include an entity, a risk, and a relationship. Additionally or alternatively, the feature vectors may be assigned metadata that indicates a document identifier and a paragraph identifier (shown as being included in the feature vectors in FIG. 5). In the example shown in FIG. 5, the extractions may be used to generate a first feature vector 540, a second feature vector 542, a third feature vector 544, a fourth feature vector 546, and a fifth feature vector 548. In this example, first feature vector 540 is <E1, R1, y, D1P1>, where E1 is the first entity "former businessman," R1 is the first risk "money laundering," 'y' indicates that there is a relationship between E1and R1, and D1P1 indicates that E1 and D1 appear in a first document (e.g., document 520), indicated by 'D1,' and the first paragraph of the first document, indicated by 'P1.' In this example, second feature vector 542 is <E1, R2, y, D1P1>, third feature vector 544 is <E2, R3, y, D1P1>, fourth feature vector 546 is <E3, R4, y, D1P2> (e.g., indicating that E3 and R4 appear in the second paragraph of document 520), and fifth feature vector 548 is <E4, R5, n, D1P2> (e.g., indicating that there is no relationship between E4 and R5).

Figure 6:
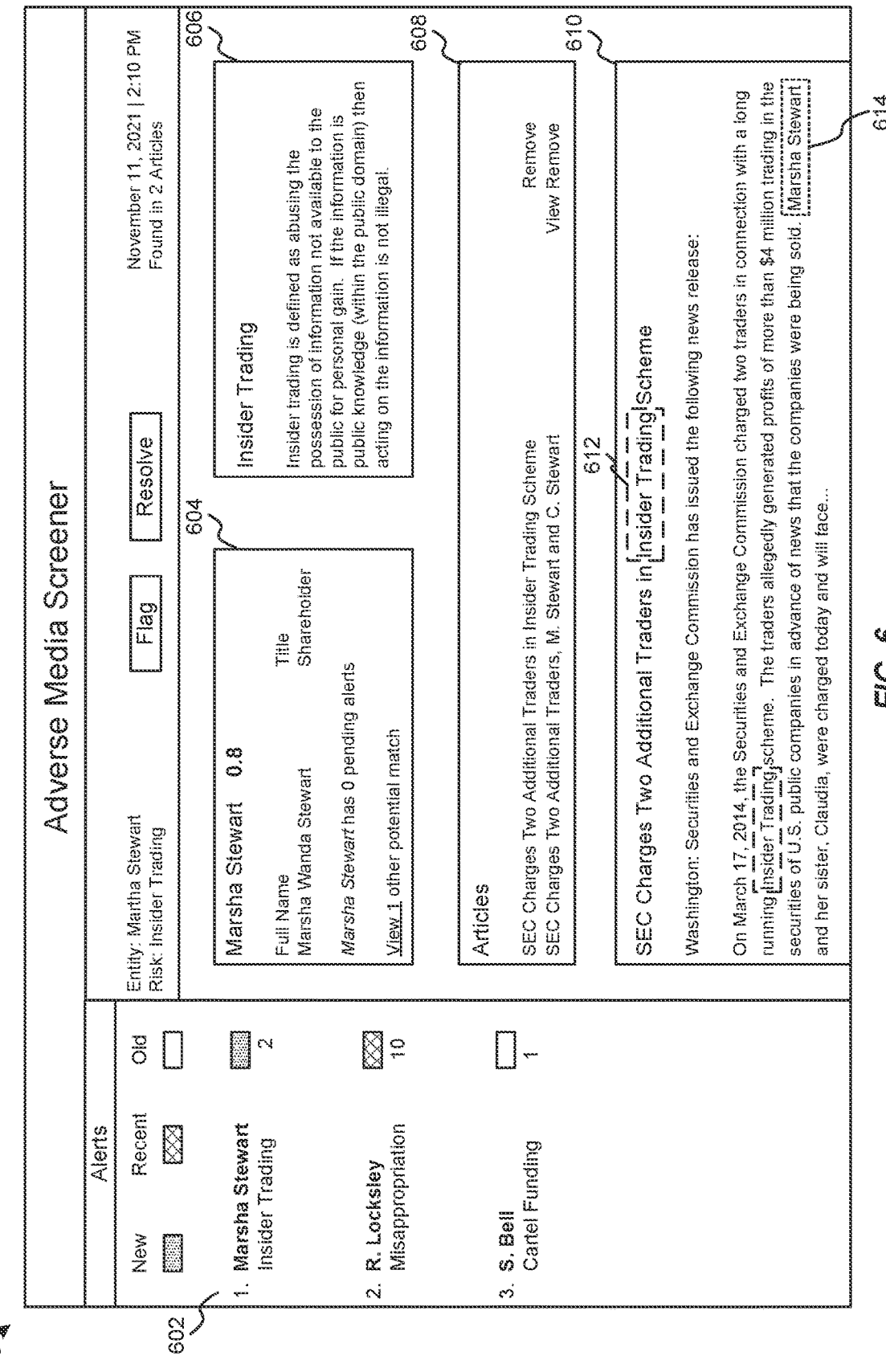
FIG. 6 illustrates an example of a graphical user interface (GUI) configured to output filtered documents according to one or more aspects.

Referring to FIG. 6, an example of a GUI configured to output filtered documents according to one or more aspects is shown as a GUI 600. The example GUI shown in FIG. 6 is illustrative, and particular aspects of GUI 600 are not intended to be limiting. For example, in other examples, different windows and information may be included, the layout shown may be different, or the like. As shown in FIG. 6, GUI 600 (e.g., an adverse media screener GUI) includes an alert selection window and an alert window. The alert selection window may display one or more alerts that are generated based on filtered feature vectors, as described above with reference to FIGS. 1-4. For example, the one or more alerts may include a first alert 602, a second alert, and a third alert. Each alert may be represented by a selectable indicator that is configured to, upon selection (e.g., via clicking with a mouse, tapping a touchpad, etc.), causes the alert window to display additional details corresponding to the alert. Additionally or alternatively, the alert selection window may display a name of an entity corresponding to the alert, a status indicator that indicates an approximate time of the alert, a risk corresponding to the alert, and a number of articles (e.g., documents) that correspond to the alert. In the example shown in FIG. 6, a first alert is an alert for the entity "Marsha Stewart" and the risk "Insider Trading," the first alert is a new alert, and there are two articles that correspond to the first alert.

The alert window includes summarized information (e.g., the entity name and the risk name, the number of articles corresponding to the alert, the date/time, etc.), one or more buttons for responding to the alert, an entity window 604, a risk window 606, an article selection window 608, and an article review window 610. The buttons may enable a user of GUI 600 to perform one or more actions by selecting the buttons. For example, a flag button may cause the alert to be flagged for later review and response, and a resolve button may cause GUI 600 to display one or more recommend actions for resolving the alert and/or to enable the user to initiate performance of one or more actions by the system or external devices to resolve the alert. Entity window 604 may include additional details about the extracted entity, such as the extracted entity name (e.g., "Marsha Stewart"), a confidence score ("0.8") resulting from entity resolution, a full name of the entity ("Marsha Wanda Stewart") that may include multiple fields, a title ("shareholder"), a number of other pending alerts for the entity, and one or more other potential matches for the entity, as non-limiting examples. Risk window 606 may include the name and definition of the extracted risk. Article selection window 608 may include a listing of one or more articles that correspond to the alert, and in some implementations selectable options to view or remove the articles. Article review window 610 may include a portion of a selected article that corresponds to the alert and that includes the entity and the risk. In some implementations, instances of the entity and the risk within the selected article may be highlighted or otherwise visually indicated using different colors or formats, such as a first highlight 612 that indicates a risk and a second highlight 614 that indicates an entity. In this manner, GUI 600 may provide a user with relevant articles and identification of entities and risks within the articles for use in making informed decisions about how to respond to compliance-related risks identified in articles. Such results are generated and displayed with fewer false positives and less relevant results than conventional document screening applications or manual techniques.

FIG. 7 is a flow diagram of a method 700 for relevance-based document analysis and filtering, according to one or more aspects. In some implementations, the operations of method 700 may be stored as instructions that, when executed by one or more processors (e.g., the one or more processors of a computing device or a server), cause the one or more processors to perform the operations of method 700. In some implementations, method 700 may be performed by system 100 of FIG. 1, one or more components to execute the operations described with reference to FIG. 2, system 300 of FIG. 3, or one or more components to execute the operations described with reference to FIG. 4.

Method 700 includes performing one or more NLP operations on one or more input documents to generate document text data, at 702. For example, the document text data may include or correspond to document text data generated by NLP engine 120 of FIG. 1. Method 700 includes providing the document text data as input to one or ML models to generate one or more feature vectors, at 704. The one or more ML models are trained to extract feature vectors of particular features from input documents, and the particular features include an entity, a risk, and a relationship indicator representing whether a relationship between the entity and the risk exists within a corresponding document. For example, the one or more ML models may include or correspond to ML models included in or accessed by ML extractor/classifier 122 of FIG. 1, and the feature vectors may include or correspond to feature vectors output by ML extractor/classifier 122 of FIG. 1.

Method 700 includes performing entity matching between the one or more feature vectors and an entity list to generate scores corresponding to the one or more feature vectors, at 706. Each of the scores indicates a likelihood that a respective feature vector includes an entity from the entity list. For example, the scores may include or correspond to scores generated by entity matcher 124 of FIG. 1. Method 700 includes filtering the one or more feature vectors based on the scores to generate a subset of feature vectors, at 708. For example, the subset of feature vectors may include or correspond to filtered feature vectors (e.g., a subset of feature vectors) output by filter 126 of FIG. 1. Method 700 further includes generating an output based on the subset of feature vectors, at 710. For example, the output may include or correspond to an output generated by output generator 128 of FIG. 1, such as a GUI and/or an instruction to perform one or more actions based on the subset of feature vectors.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-7 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for relevance-based document analysis and filtering, the method comprising:

performing, by one or more processors, natural language processing (NLP) operations on a labeled corpus of documents to generate labeled NLP data, wherein, for one or more documents of the labeled corpus of documents, an entity label corresponds to an entity within the document, a risk label corresponds to a risk within the document, and a relationship label indicates whether the entity and the risk are related, and wherein at least a portion of the labeled corpus of documents includes information indicating a plurality of compliance-related risks for a particular industry or sector;

providing, by the one or more processors, the labeled NLP data to one or more machine learning (ML) models to train the one or more ML models to extract feature vectors of particular features from received documents, wherein the particular features include an entity, a risk, and a relationship indicator representing whether a relationship between the entity and the risk exists within a corresponding document, and wherein at least a subset of the feature vectors comprise at least one relationship indicator indicating that a relationship between the entity and the risk does not exist within the corresponding document;

performing, by one or more processors, one or more NLP operations on one or more input documents to generate document text data;

generating, by the one or more processors, one or more feature vectors for the document text data by providing the document text data as input to the ML models, wherein the one or more ML models are trained to extract feature vectors of particular features from input documents, and wherein the one or more feature vectors include a vector with:

a first vector element corresponding to an entity, a second vector element corresponding to a risk, and a third vector element corresponding to a relationship indicator, the relationship indicator representing whether a relationship between the entity and the risk exists within a corresponding document, and wherein at least a subset of the feature vectors comprise at least one feature vector having the third vector element indicating that a relationship between the entity and the risk does not exist within the corresponding document;

performing, by the one or more processors, entity matching between the one or more feature vectors and an entity list to generate scores corresponding to the one or more feature vectors, wherein each of the scores indicates a likelihood that a respective feature vector includes an entity from the entity list;

filtering, by the one or more processors, the one or more feature vectors based on the scores to generate a subset of feature vectors;

storing, by the one or more processors, the subset of feature vectors;

generating, by the one or more processors, an output based on the subset of feature vectors; and displaying, by the one or more processors, portions of at least a subset of the input documents based on the output via graphical user interface (GUI).

2. The method of claim 1, further comprising associating, by the one or more processors, metadata with the one or more feature vectors, the metadata identifying, for each of the one or more feature vectors, an input document of the one or more input documents that corresponds to the feature vector, wherein the GUI displays portions of input documents indicated by metadata, and wherein the metadata is generated based on an entity and a risk identified from a common portion of the corresponding input document.

3. The method of claim 1, wherein the output comprises an instruction to automatically perform a compliance-related activity based on one or more entities, one or more risks, or both, included in the subset of feature vectors.

4. The method of claim 1, further comprising performing, by the one or more processors and prior to performing the entity matching, entity resolution to differentiate one or more entities included in the one or more feature vectors based on corresponding risks included in the one or more feature vectors, other information in the one or more input documents corresponding to the one or more feature vectors, or a combination thereof.

5. A system for relevance-based document analysis and filtering, the system comprising:

a memory; and one or more processors communicatively coupled to the memory, the one or more processors configured to:

perform, by the one or more processors, natural language processing (NLP) operations on a labeled corpus of documents to generate labeled NLP data, wherein, for one or more documents of the labeled corpus of documents, an entity label corresponds to an entity within the document, a risk label corresponds to a risk within the document, and a relationship label indicates whether the entity and the risk are related, and wherein at least a portion of the labeled corpus of documents includes information indicating a plurality of compliance-related risks for a particular industry or sector;

provide, by the one or more processors, the labeled NLP data to one or more machine learning (ML) models to train the one or more ML models to extract feature vectors of the particular features from received documents, wherein the particular features include an entity, a risk, and a relationship indicator representing whether a relationship between the entity and the risk exists within a corresponding document, and wherein at least a subset of the feature vectors comprise at least one relationship indicator indicating that a relationship between the entity and the risk does not exist within the corresponding document;

perform one or more NLP operations on one or more input documents to generate document text data;

generate one or more feature vectors by providing the document text data as input to the one or more ML models, wherein the one or more ML models are trained to extract feature vectors of particular features from input documents, and wherein individual feature vectors of the one or more feature vectors include:

a first vector element corresponding to an entity, a second vector element corresponding to a risk, and a third vector element corresponding to a relationship indicator, the relationship indicator representing whether a relationship between the entity and the risk exists within a corresponding document, and wherein at least a subset of the feature vectors comprise at least one feature vector having the third vector element indicating that a relationship between the entity and the risk does not exist within the corresponding document;

perform entity matching between the one or more feature vectors and an entity list to generate scores corresponding to the one or more feature vectors, wherein each of the scores indicates a likelihood that a respective feature vector includes an entity from the entity list;

filter the one or more feature vectors based on the scores to generate a subset of feature vectors;

store the subset of feature vectors;

generate an output based on the subset of feature vectors; and display portions of at least a subset of the input documents based on the output via graphical user interface (GUI).

6. The system of claim 5, wherein the one or more processors are further configured to perform the entity matching on a first feature vector of the one or more feature vectors by comparing each field of a first entity in the first feature vector to each field of entities in the entity list, and wherein fields of entities included in the one or more feature vectors comprise a first name, a middle name, a last name, a title, an enterprise name, a business name, or a combination thereof.

7. The system of claim 6, wherein a score corresponding to the first feature vector is based on a number of fields that match between the first entity and an entry in the entity list, a degree of similarity between the fields of the first entity and the fields of the entity in the entity list, or a combination thereof.

8. The system of claim 6, wherein the one or more processors are further configured to:

access one or more data sources to determine one or more additional entity names or field entries; and augment the entity list to include the one or more additional entity names or field entries prior to performance of the entity matching between the one or more feature vectors and the entity list.

9. The system of claim 5, wherein the one or more processors are further configured to perform risk matching between the one or more feature vectors and a risk list to generate risk scores corresponding to the one or more feature vectors, wherein each of the risk scores indicates a likelihood that a respective feature vector includes a risk from the risk list, and wherein the one or more feature vectors are filtered based further on the risk scores.

10. A non-transitory computer-readable storage medium storing instructions that, when executed by one or more processors, cause the one or more processors to perform operations for relevance-based document analysis and filtering, the operations comprising:

performing, by the one or more processors, natural language processing (NLP) operations on a labeled corpus of documents to generate labeled NLP data, wherein, for one or more documents of the labeled corpus of documents, an entity label corresponds to an entity within the document, a risk label corresponds to a risk within the document, and a relationship label indicates whether the entity and the risk are related, and wherein at least a portion of the labeled corpus of documents includes information indicating a plurality of compliance-related risks for a particular industry or sector;

providing, by the one or more processors, the labeled NLP data to one or more machine learning (ML) models to train the one or more ML models to extract feature vectors of the particular features from received documents, wherein the particular features include an entity, a risk, and a relationship indicator representing whether a relationship between the entity and the risk exists within a corresponding document, and wherein at least a subset of the feature vectors comprise at least one relationship indicator indicating that a relationship between the entity and the risk does not exist within the corresponding document;

performing, by the one or more processors, one or more NLP operations on one or more input documents to generate document text data;

generating one or more feature vectors for the document text data by providing, by the one or more processers, the document text data as input to the one or more ML models, wherein the one or more ML models are trained to extract feature vectors of particular features from input documents, and wherein the at least one feature vector of the one or more feature vectors includes a vector having:

a first vector element corresponding to an entity, a second vector element corresponding to a risk, and a third vector element corresponding to a relationship indicator, the relationship indicator representing whether a relationship between the entity and the risk exists within a corresponding document, and wherein at least a subset of the feature vectors comprise at least one vector element indicating that a relationship between the entity and the risk does not exist within the corresponding document;

performing, by the one or more processors, entity matching between the one or more feature vectors and an entity list to generate scores corresponding to the one or more feature vectors, wherein each of the scores indicates a likelihood that a respective feature vector includes an entity from the entity list;

filtering, by the one or more processors, the one or more feature vectors based on the scores to generate a subset of feature vectors;

storing, by the one or more processors, the subset of feature vectors;

generating, by the one or more processors, an output based on the subset of feature vectors; and displaying, by the one or more processors, portions of at least a subset of the input documents based on the output via graphical user interface (GUI).

11. The non-transitory computer-readable storage medium of claim 10, wherein the filtering comprises discarding feature vectors corresponding to scores that fail to satisfy a threshold, discarding a threshold number of lowest scoring feature vectors, or a combination thereof.

12. The non-transitory computer-readable storage medium of claim 10, wherein the operations further comprise providing the subset of feature vectors to one or more client devices associated with document experts, and wherein the subset of feature vectors is further filtered based on user input received from the one or more client devices.

13. The non-transitory computer-readable storage medium of claim 10, wherein the operations further comprise generating relevance ratings based on the scores of the subset of feature vectors, and wherein the output indicates the relevance ratings.

14. The method of claim 1, wherein the NLP operations comprise tokenization, lemmatization, stemming, phrasing, sentencization, part-of-speech tagging, dependency parsing, stop-character parsing, named entity recognition, or a combination thereof.

15. The method of claim 1, further comprising identifying, by the one or more processors, an entity and a risk as co-occurring within a same portion of an input document, and wherein the relationship indicator represents whether a semantic relationship exists or does not exist between the co-occurring entity and risk within that portion of the input document.

16. The method of claim 1, further comprising associating, by the one or more processors, metadata with the one or more feature vectors, the metadata including a word count corresponding to a location of an extracted vector element in the one or more input documents.

17. The method of claim 1, wherein the third vector element includes a binary value.

18. The method of claim 1, wherein the third vector element indicates an active status or an expired status.

19. The method of claim 1, wherein the third vector element indicates a predicate of a sentence connecting a subject and an object.

* * * * *